(12) United States Patent
Zheng et al.

(10) Patent No.: US 12,414,057 B2
(45) Date of Patent: Sep. 9, 2025

(54) METHOD AND APPARATUS FOR DETERMINING INITIAL BANDWIDTH PART BWP, AND STORAGE MEDIUM

(71) Applicant: HUAWEI TECHNOLOGIES CO., LTD., Guangdong (CN)

(72) Inventors: Juan Zheng, Beijing (CN); Chaojun Li, Beijing (CN); Hailong Hou, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 17/870,499

(22) Filed: Jul. 21, 2022

(65) Prior Publication Data

US 2022/0361122 A1 Nov. 10, 2022

Related U.S. Application Data

(63) Continuation of application No. PCT/CN2020/073794, filed on Jan. 22, 2020.

(51) Int. Cl.
*H04W 56/00* (2009.01)
*H04W 52/36* (2009.01)
*H04W 68/00* (2009.01)
*H04W 72/0453* (2023.01)
*H04W 72/51* (2023.01)

(52) U.S. Cl.
CPC ....... *H04W 56/001* (2013.01); *H04W 52/367* (2013.01); *H04W 68/005* (2013.01); *H04W 72/0453* (2013.01); *H04W 72/51* (2023.01)

(58) Field of Classification Search
CPC . H04W 56/001; H04W 72/51; H04W 52/367; H04W 68/005; H04W 72/0453
See application file for complete search history.

(56) References Cited

U.S. PATENT DOCUMENTS 12,089,256 B2 * 9/2024 Jiang ................. H04B 7/0695
2019/0254073 A1 * 8/2019 Sheng ................. H04W 76/11
(Continued)

FOREIGN PATENT DOCUMENTS

CN 108990161 A 12/2018
CN 110115008 A 8/2019
(Continued)

OTHER PUBLICATIONS

Ericsson, "NR for Industrial Sensors (draft SID)," 3GPP TSG RAN Meeting #83, RP-190432, Shenzhen, China, Mar. 18-21, 2019, 4 pages.
(Continued)

*Primary Examiner* — Sujoy K Kundu
*Assistant Examiner* — Weibin Huang
(74) *Attorney, Agent, or Firm* — Fish & Richardson P.C.

(57) ABSTRACT

The present disclosure relates to methods and apparatus for determining an initial bandwidth part. One example method includes determining a frequency resource of a first initial BWP, where the frequency resource of the first initial BWP is included in a frequency resource of a second initial BWP, the frequency resource of the first initial BWP corresponds to a first-type terminal device, the frequency resource of the second initial BWP corresponds to a second-type terminal device, and the terminal devices of two types have different capabilities.

16 Claims, 15 Drawing Sheets

(56) References Cited

U.S. PATENT DOCUMENTS

| | | | |
|---|---|---|---|
| 2019/0261425 A1 | 8/2019 | Park et al. | |
| 2019/0313412 A1 | 10/2019 | Baldemair et al. | |
| 2019/0313437 A1* | 10/2019 | Jung | H04L 5/0042 |
| 2019/0320455 A1* | 10/2019 | Chen | H04W 72/1273 |
| 2020/0008131 A1* | 1/2020 | Chakraborty | H04W 72/046 |
| 2020/0045707 A1* | 2/2020 | Hwang | H04W 76/28 |
| 2020/0221308 A1* | 7/2020 | Liao | H04L 5/001 |
| 2020/0288508 A1* | 9/2020 | Shi | H04W 74/0833 |
| 2023/0031875 A1* | 2/2023 | Dai | H04L 5/0012 |

FOREIGN PATENT DOCUMENTS

| | | |
|---|---|---|
| CN | 110324897 A | 10/2019 |
| CN | 110351843 A | 10/2019 |
| CN | 110475361 A | 11/2019 |
| EP | 4017178 A1 | 6/2022 |
| WO | 2019050323 A1 | 3/2019 |
| WO | 2019066533 A1 | 4/2019 |
| WO | 2019190229 A1 | 10/2019 |
| WO | 2020009144 A1 | 1/2020 |

OTHER PUBLICATIONS

Huawei, HiSilicon, "Key points on NR Light SID," 3GPP TSG RAN Meeting #86, RP-192788, Sitges, Spain, Dec. 9-12, 2019, 3 pages.

MediaTek Inc., "Summary of Bandwidth Part Remaining Issues," 3GPP TSG RAN WG1 Meeting #94, R1-1809929, Gothenburg, Sweden, Aug. 20-24, 2018, 22 pages.

Nokia, Nokia Shanghai Bell, "On wideband operation in NR-U," 3GPP TSG RAN WG1 Meeting #96bis, R1-1904194, Xi'an, China, Apr. 8-12, 2019, 15 pages.

PCT International Search Report and Written Opinion issued in International Application No. PCT/CN2020/073794 on Oct. 27, 2020, 17 pages (with English translation).

Vivo, "Motivation for NR diverse UE types in Rel-17," 3GPP TSG RAN Meeting #84, RP-191305, Newport Beach, USA, Jun. 3-6, 2019, 3 pages.

NTT Docomo, Inc., "Remaining issues on RMSI," 3GPP TSG RAN WG1 Meeting #93, R1-1807051, Busan, Korea, May 21-25, 2018, 5 pages.

Extended European Search Report in European Appln No. 20916203. 1, dated Mar. 3, 2023, 13 pages.

Ericsson, "New SID on support of reduced-capability NR-Light devices," 3GPP TSG RAN #86, RP-193146, Sitges, Spain, Dec. 9-12, 2019, 7 pages.

Huawei et al., "Discussion on cell definition," 3GPP TSG RAN WG2 #101, R2-1801820, Athens, Greece, Feb. 26-Mar. 2, 2018, 4 pages.

Office Action in Japanese Appln. No. 2022-544266, mailed on Jul. 25, 2023, 9 pages (with English translation).

Office Action in Indian Appln. No. 202237043965, dated Feb. 16, 2023, 6 pages (with English translation).

\* cited by examiner a b

| Bandwidth of a second-type terminal device | Second frequency offset | Bandwidth of a first-type terminal device | First frequency offset |
|---|---|---|---|
| 48 | 12 | 24 | 0 |
| 48 | 16 | 24 | 4 |
| 96 | 38 | 24 | 0 | a

| Second initial BWP bandwidth | Second frequency offset | First initial BWP bandwidth | First frequency offset |
|---|---|---|---|
| 48 | 18 | 24 | Either of {5, 6} |
| 48 | 20 | 24 | Either of {7, 8} | b

FIG. 6

METHOD AND APPARATUS FOR DETERMINING INITIAL BANDWIDTH PART BWP, AND STORAGE MEDIUM

CROSS-REFERENCE TO RELATED APPLICATIONS

This application is a continuation of International Application No. PCT/CN2020/073794, filed on Jan. 22, 2020, the disclosure of which is hereby incorporated by reference in its entirety.

TECHNICAL FIELD

This application relates to the communication field, and in particular, to a method and an apparatus for determining an initial bandwidth part BWP and a storage medium.

BACKGROUND

A new radio (new radio, NR) system is a fifth generation (fifth generation, 5G) mobile communication technology standard based on a new orthogonal frequency division multiplexing (orthogonal frequency division multiplexing, OFDM) air interface design, and is also a very important basis of a next-generation cellular mobile technology. There are quite diversified services in the NR system, and the services may include an enhanced mobile broadband (enhanced mobile broadband, eMBB) service, an ultra-reliable low-latency communication (ultra-reliable low-latency communication, URLLC) service, and a massive machine-type communications (massive machine-type communications, mMTC) service.

Diversified services in the NR system require that the NR system be designed to meet access requirements of terminal devices with different bandwidth capabilities. For example, a terminal device that transmits the eMBB service and a terminal device that transmits the URLLC service may access the NR system by determining broadband information of the NR system. In contrast, in consideration of design costs, low power consumption, and the like, some terminal devices that transmit the mMTC service are usually not designed with very large operating bandwidth for data transmission, and consequently usually perform access only by using narrow bandwidth.

Bandwidth in the NR system is wide, and is at least 100 MHz. Due to different bandwidth capabilities of terminal devices, maximum bandwidth supported by the terminal devices is different. Some terminal devices may support only 80 MHz, 40 MHz, 20 MHz, or even narrower bandwidth. Therefore, usually, in NR, a concept of initial downlink bandwidth part (bandwidth part, BWP) is introduced to adapt to a requirement of a terminal device for maximum bandwidth.

SUMMARY

This application provides a method and an apparatus for determining an initial downlink bandwidth part BWP and a storage medium, and provides a new initial BWP design solution, so that initial bandwidth parts of terminal devices of different types can be configured differently, thereby improving initial access performance of the terminal devices of different types.

A first aspect of this application provides a method for determining an initial bandwidth part BWP. The method may be used in a wireless communication system, including a 4.5G or 5G wireless communication system, an NR-based further evolved system, and a future wireless communication system.

The method may include: determining a frequency resource of a first initial BWP corresponding to a first-type terminal device, where the frequency resource of the first initial BWP may be included in a frequency resource of a second initial BWP corresponding to a second-type terminal device, and the first-type terminal device and the second-type terminal device have different capabilities; and transmitting signaling and/or data to a network device based on the frequency resource of the first initial BWP.

This application relates to terminal devices of two types. The terminal device may also be referred to as a terminal, user equipment (user equipment, UE), a mobile station (mobile station, MS), a mobile terminal (mobile terminal, MT), or the like. The terminal device in embodiments of this application may be a mobile phone (mobile phone), a tablet computer (Pad), or a computer that has a wireless transceiver function, or may be a wireless terminal used in scenarios such as virtual reality (virtual reality, VR), augmented reality (augmented reality, AR), industrial control (industrial control), self driving (self driving), telemedicine (telemedicine), a smart grid (smart grid), transportation safety (transportation safety), a smart city (smart city), and a smart home (smart home). In this application, the foregoing terminal device and a chip that can be used in the foregoing terminal device are collectively referred to as a terminal device. It should be understood that a specific technology used by and a specific device form of the terminal device are not limited in embodiments of this application.

It can be learned from the first aspect that the first aspect provides a new method for determining an initial bandwidth part BWP. The method has a simple design, has an original design intention of an existing second initial BWP, and reduces standard design complexity.

Optionally, with reference to the first aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers. Terminal devices of two types correspond to different protocol versions. For example, an NR terminal device corresponding to Release 15 and an NR terminal device corresponding to Release 17 may be considered as the terminal devices of two types. The terminal devices of two types support different carrier aggregation capabilities. The terminal devices of two types have different data processing time capabilities.

Optionally, with reference to the first aspect or the first possible implementation of the first aspect, in a second possible implementation, the frequency resource of the first initial BWP is determined based on a first frequency offset, the first frequency offset belongs to a first set, and the first set is a set of second frequency offsets. The first frequency offset is an offset of the frequency resource of the first initial BWP relative to a frequency resource of a synchronization signal block SSB, and the second frequency offset is an offset of the frequency resource of the second initial BWP relative to the frequency resource of the SSB. It can be learned from the second possible implementation of the first aspect that a nesting relationship between the frequency resource of the first initial BWP and the frequency resource of the second initial BWP can be implemented, to reduce system bandwidth required by the system to support diversified terminal devices.

Optionally, with reference to the second possible implementation of the first aspect, in a third possible implementation, the first frequency offset is determined based on first configuration information from the network device, and the first configuration information is used to configure the frequency resource of the second initial BWP. It can be learned from the third possible implementation of the first aspect that, the network device does not need to additionally send, to the second-type terminal device, indication information used to determine the frequency resource of the first initial BWP. This can reduce overheads of sending control information by the network device, and save energy of the network device.

Optionally, with reference to the second possible implementation of the first aspect or the third possible implementation of the first aspect, in a fourth possible implementation, the first frequency offset is the same as the second frequency offset.

Optionally, with reference to the third possible implementation of the first aspect, in a fifth possible implementation, that the first frequency offset is determined based on first configuration information from the network device may include: The first-type terminal device determines a first index value based on the first configuration information. The first-type terminal device determines M index values, where M is a positive integer, the M index values and the first index value are used to indicate the frequency offsets that may be included in the first set, and the M index values are all less than or equal to an index value of the first index value. The first-type terminal device determines the first frequency offset based on a frequency offset indicated by any one of the M index values. It can be learned from the fifth possible implementation of the first aspect that a specific manner of determining the first frequency offset is provided, so that diversity of the solutions is increased.

Optionally, with reference to the third possible implementation of the first aspect, in a sixth possible implementation, that the first frequency offset is determined based on first configuration information from the network device may include: The first-type terminal device determines a first index value based on the first configuration information. The first-type terminal device determines a second index value, where the second index value is a value obtained by performing a modulo operation on the first index value using a preset value, and the first index value and the second index value indicate the frequency offsets that may be included in the first set. The first-type terminal device determines the first frequency offset based on the second index value. It can be learned from the sixth possible implementation of the first aspect that a specific manner of determining the first frequency offset is provided, so that diversity of the solutions is increased.

Optionally, with reference to the second possible implementation of the first aspect, in a seventh possible implementation, the first frequency offset is determined based on a first quantity of time-frequency resources, the first quantity of time-frequency resources and a second quantity of time-frequency resources correspond to the frequency offsets that may be included in the first set, the first quantity of time-frequency resources is a quantity of time-frequency resources closest to the second quantity of time-frequency resources, and the second quantity of time-frequency resources is a quantity of time-frequency resources corresponding to a CORESET 0 of the second-type terminal device. It can be learned from the seventh possible implementation of the first aspect that a specific manner of determining the first frequency offset is provided, so that diversity of the solutions is increased.

Optionally, with reference to the first aspect or the first to the seventh possible implementations of the first aspect, in an eighth possible implementation, the method may further include: determining a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device. It can be learned from the eighth possible implementation of the first aspect that, when the system starts to support service transmission of the first-type terminal device, service transmission of the second-type terminal device that may have been deployed in the system is not affected by the introduction of the first-type terminal device. Particularly, when common information transmission corresponding to the second-type terminal device and SSB transmission are performed in a same slot or a same radio frame, in this implementation, impact on initial access of the second-type terminal device can be avoided.

Optionally, with reference to the eighth possible implementation of the first aspect, in a ninth possible implementation, the method may further include: first time resources corresponding to the same SSB are distributed in two consecutive slots in a radio frame. It can be learned from the ninth possible implementation of the first aspect that, joint channel estimation performance of control information that is for scheduling common information transmission and that is transmitted in a plurality of first time resources can be ensured, so that the terminal device implements combination detection performance.

Optionally, with reference to the first aspect or the first to the seventh possible implementations of the first aspect, in a tenth possible implementation, a time resource of a first control resource set 0 CORESET 0 corresponding to the first-type terminal device is determined, where a first time resource may be included in a second time resource. It can be learned from the tenth possible implementation of the first aspect that a specific design manner of the first time resource is provided, so that diversity of the solutions is increased.

Optionally, with reference to the first aspect or the first to the seventh possible implementations of the first aspect, in an eleventh possible implementation, a time resource of a first control resource set 0 CORESET 0 corresponding to the first-type terminal device is determined, where a first time resource may be included in a time resource of the synchronization signal block SSB. It can be learned from the eleventh possible implementation of the first aspect that a specific design manner of the first time resource is provided, so that diversity of the solutions is increased.

Optionally, with reference to the eighth to the tenth possible implementations of the first aspect, in a twelfth possible implementation, the first time resource is determined based on second configuration information from the network device, and the second configuration information is used to configure the second time resource. It can be learned from the twelfth possible implementation of the first aspect that, the network device does not need to additionally send, to the second-type terminal device, indication information used to determine the first time resource. This can reduce overheads of sending control information by the network device, and save energy of the network device.

A second aspect of this application provides a method for determining an initial downlink bandwidth part BWP. The method may include: A first-type terminal device determines a frequency resource of an initial BWP corresponding to the first-type terminal device, where the frequency resource of the first initial BWP does not overlap a frequency resource of a second initial BWP, and the first-type terminal device and a second-type terminal device have different capabilities. It can be learned from the second aspect that, because the frequency resource of the first initial BWP does not overlap the frequency resource of the second initial BWP, impact on data transmission of the second-type terminal device can be reduced. For a system with large system bandwidth, in this implementation, diversified data services can be supported (for example, both an eMBB service and an mMTC service are supported) without affecting a deployed eMBB service.

Optionally, with reference to the second aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the second aspect or the first possible implementation of the second aspect, in a second possible implementation, a time resource of a first control resource set 0 CORESET 0 corresponding to the first-type terminal device is determined, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the second possible implementation of the second aspect, in a third possible implementation, the method may further include: first time resources corresponding to the same SSB are distributed in two consecutive slots in a radio frame.

Optionally, with reference to the second aspect or the first possible implementation of the second aspect, in a fourth possible implementation, a time resource of a first control resource set 0 CORESET 0 corresponding to the first-type terminal device is determined, where a first time resource may be included in a second time resource.

Optionally, with reference to the second aspect or the first possible implementation of the second aspect, in a fifth possible implementation, a time resource of a first control resource set 0 CORESET 0 corresponding to the first-type terminal device is determined, where a first time resource may be included in a time resource of the synchronization signal block SSB.

Optionally, with reference to the second to the fourth possible implementations of the second aspect, in a sixth possible implementation, the first time resource is determined based on second configuration information from the network device, and the second configuration information is used to configure the second time resource.

A third aspect of this application provides a method for determining an initial downlink bandwidth part BWP. The method may include: A first-type terminal device determines a frequency resource of an initial BWP corresponding to the first-type terminal device, where the frequency resource of the first initial BWP does not overlap a frequency resource of a synchronization signal block SSB, and the first-type terminal device and a second-type terminal device have different capabilities. It can be learned from the third aspect that a system frequency resource can be effectively used, to implement a nesting relationship between the frequency resource of the first initial BWP and a frequency resource of a second initial BWP. This is particularly applicable to a system that has small system bandwidth but needs to serve diversified services.

Optionally, with reference to the third aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the third aspect or the first possible implementation of the third aspect, in a second possible implementation, a time resource of a first control resource set 0 CORESET 0 corresponding to the first-type terminal device is determined, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the second possible implementation of the third aspect, in a third possible implementation, the method may further include: first time resources corresponding to the same SSB are distributed in two consecutive slots in a radio frame.

Optionally, with reference to the third aspect or the first possible implementation of the third aspect, in a fourth possible implementation, a time resource of a first control resource set 0 CORESET 0 corresponding to the first-type terminal device is determined, where a first time resource may be included in a second time resource.

Optionally, with reference to the third aspect or the first possible implementation of the third aspect, in a fifth possible implementation, a time resource of a first control resource set 0 CORESET 0 corresponding to the first-type terminal device is determined, where a first time resource may be included in a time resource of the synchronization signal block SSB.

Optionally, with reference to the second to the fourth possible implementations of the third aspect, in a sixth possible implementation, the first time resource is determined based on second configuration information from the network device, and the second configuration information is used to configure the second time resource.

A fourth aspect of this application provides an apparatus for determining an initial downlink bandwidth part BWP. The apparatus may include: a processing unit, configured to determine a frequency resource of a first initial BWP corresponding to a first-type terminal device, where the frequency resource of the first initial BWP may be included in a frequency resource of a second initial BWP corresponding to a second-type terminal device, and the first-type terminal device and the second-type terminal device have different capabilities; and a communication unit, configured to transmit signaling and/or data to a network device based on the frequency resource of the first initial BWP.

Optionally, with reference to the fourth aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the fourth aspect or the first possible implementation of the fourth aspect, in a second possible implementation, the frequency resource of the first initial BWP is determined based on a first frequency offset, the first frequency offset belongs to a first set, and the first set is a set of second frequency offsets. The first frequency offset is an offset of the frequency resource of the first initial BWP relative to a frequency resource of a synchronization signal block SSB, and the second frequency offset is an offset of the frequency resource of the second initial BWP relative to the frequency resource of the SSB.

Optionally, with reference to the second possible implementation of the fourth aspect, in a third possible implementation, the first frequency offset is determined based on first configuration information from the network device, and the first configuration information is used to configure the frequency resource of the second initial BWP.

Optionally, with reference to the second possible implementation of the fourth aspect or the third possible implementation of the fourth aspect, in a fourth possible implementation, the first frequency offset is the same as the second frequency offset.

Optionally, with reference to the third possible implementation of the fourth aspect, in a fifth possible implementation, the processing unit is specifically configured to determine: a first index value based on the first configuration information; determine M index values, where M is a positive integer, the M index values and the first index value are used to indicate the frequency offsets that may be included in the first set, and the M index values are all less than or equal to an index value of the first index value; and determine the first frequency offset based on a frequency offset indicated by any one of the M index values.

Optionally, with reference to the third possible implementation of the fourth aspect, in a sixth possible implementation, the processing unit is specifically configured to determine: a first index value based on the first configuration information; determine a second index value, where the second index value is a value obtained by performing a modulo operation on the first index value using a preset value, and the first index value and the second index value indicate the frequency offsets that may be included in the first set; and determine the first frequency offset based on the second index value.

Optionally, with reference to the second possible implementation of the fourth aspect, in a seventh possible implementation, the first frequency offset is determined based on a first quantity of time-frequency resources, the first quantity of time-frequency resources and a second quantity of time-frequency resources correspond to the frequency offsets that may be included in the first set, the first quantity of time-frequency resources is a quantity of time-frequency resources closest to the second quantity of time-frequency resources, and the second quantity of time-frequency resources is a quantity of time-frequency resources corresponding to a CORESET 0 of the second-type terminal device.

Optionally, with reference to the fourth aspect or the first to the seventh possible implementations of the fourth aspect, in an eighth possible implementation, the processing unit is further configured to: determine a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the eighth possible implementation of the fourth aspect, in a ninth possible implementation, first time resources corresponding to the same SSB are distributed in two consecutive slots in a radio frame.

Optionally, with reference to the fourth aspect or the first to the seventh possible implementations of the fourth aspect, in a tenth possible implementation, the processing unit is further configured to determine a time resource of a first control resource set 0 CORESET 0 corresponding to the first-type terminal device, where a first time resource may be included in a second time resource.

Optionally, with reference to the fourth aspect or the first to the seventh possible implementations of the fourth aspect, in an eleventh possible implementation, the processing unit is further configured to determine a time resource of a first control resource set 0 CORESET 0 corresponding to the first-type terminal device, where a first time resource may be included in a time resource of the synchronization signal block SSB.

Optionally, with reference to the eighth to the tenth possible implementations of the fourth aspect, in a twelfth possible implementation, the first time resource is determined based on second configuration information from the network device, and the second configuration information is used to configure the second time resource.

A fifth aspect of this application provides an apparatus for determining an initial downlink bandwidth part BWP. The apparatus may include: a processing unit, configured to determine a frequency resource of an initial BWP corresponding to a first-type terminal device, where the frequency resource of the first initial BWP does not overlap a frequency resource of a second initial BWP, and the first-type terminal device and a second-type terminal device have different capabilities; and a communication unit, configured to transmit signaling and/or data to a network device based on the frequency resource of the first initial BWP.

Optionally, with reference to the fifth aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the fifth aspect or the first possible implementation of the fifth aspect, in a second possible implementation, the processing unit is further configured to determine a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the second possible implementation of the fifth aspect, in a third possible implementation, first time resources corresponding to the same SSB are distributed in two consecutive slots in a radio frame.

Optionally, with reference to the fifth aspect or the first possible implementation of the fifth aspect, in a fourth possible implementation, the processing unit is further configured to determine a time resource of a first control resource set 0 CORESET 0 corresponding to the first-type terminal device, where a first time resource may be included in a second time resource.

Optionally, with reference to the fifth aspect or the first possible implementation of the fifth aspect, in a fifth possible implementation, the processing unit is further configured to determine a time resource of a first control resource set 0 CORESET 0 corresponding to the first-type terminal device, where a first time resource may be included in a time resource of the synchronization signal block SSB.

Optionally, with reference to the second to the fourth possible implementations of the fifth aspect, in a sixth possible implementation, the first time resource is determined based on second configuration information from the network device, and the second configuration information is used to configure the second time resource.

A sixth aspect of this application provides an apparatus for determining an initial downlink bandwidth part BWP. The apparatus may include: a processing unit, configured to determine a frequency resource of an initial BWP corresponding to a first-type terminal device, where the frequency resource of the first initial BWP does not overlap a frequency resource of a synchronization signal block SSB, and the first-type terminal device and a second-type terminal device have different capabilities; and a communication unit, configured to transmit signaling and/or data to a network device based on the frequency resource of the first initial BWP.

Optionally, with reference to the sixth aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the sixth aspect or the first possible implementation of the sixth aspect, in a second possible implementation, the processing unit is further configured to determine a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the second possible implementation of the sixth aspect, in a third possible implementation, first time resources corresponding to the same SSB are distributed in two consecutive slots in a radio frame.

Optionally, with reference to the sixth aspect or the first possible implementation of the sixth aspect, in a fourth possible implementation, the processing unit is further configured to determine a time resource of a first control resource set 0 CORESET 0 corresponding to the first-type terminal device, where a first time resource may be included in a second time resource.

Optionally, with reference to the sixth aspect or the first possible implementation of the sixth aspect, in a fifth possible implementation, the processing unit is further configured to determine a time resource of a first control resource set 0 CORESET 0 corresponding to the first-type terminal device, where a first time resource may be included in a time resource of the synchronization signal block SSB.

Optionally, with reference to the second to the fourth possible implementations of the sixth aspect, in a sixth possible implementation, the first time resource is determined based on second configuration information from the network device, and the second configuration information is used to configure the second time resource.

A seventh aspect of this application provides an apparatus for determining an initial downlink bandwidth part BWP. The apparatus may include: a processor, configured to: execute a program stored in a memory; and when the program stored in the memory is executed, determine a frequency resource of a first initial BWP corresponding to a first-type terminal device, where the frequency resource of the first initial BWP may be included in a frequency resource of a second initial BWP corresponding to a second-type terminal device, and the first-type terminal device and the second-type terminal device have different capabilities; and a communication interface, where the communication interface is coupled to the processor, and is configured to transmit signaling and/or data to a network device based on the frequency resource of the first initial BWP.

Optionally, with reference to the seventh aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the seventh aspect or the first possible implementation of the seventh aspect, in a second possible implementation, the frequency resource of the first initial BWP is determined based on a first frequency offset, the first frequency offset belongs to a first set, and the first set is a set of second frequency offsets. The first frequency offset is an offset of the frequency resource of the first initial BWP relative to a frequency resource of a synchronization signal block SSB, and the second frequency offset is an offset of the frequency resource of the second initial BWP relative to the frequency resource of the SSB.

Optionally, with reference to the second possible implementation of the seventh aspect, in a third possible implementation, the first frequency offset is determined based on first configuration information from the network device, and the first configuration information is used to configure the frequency resource of the second initial BWP.

Optionally, with reference to the second possible implementation of the seventh aspect or the third possible implementation of the seventh aspect, in a fourth possible implementation, the first frequency offset is the same as the second frequency offset.

Optionally, with reference to the third possible implementation of the seventh aspect, in a fifth possible implementation, the processor is specifically configured to determine: a first index value based on the first configuration information; determine M index values, where M is a positive integer, the M index values and the first index value are used to indicate the frequency offsets that may be included in the first set, and the M index values are all less than or equal to an index value of the first index value; and determine the first frequency offset based on a frequency offset indicated by any one of the M index values.

Optionally, with reference to the third possible implementation of the seventh aspect, in a sixth possible implementation, the processor is specifically configured to: determine a first index value based on the first configuration information; determine a second index value, where the second index value is a value obtained by performing a modulo operation on the first index value using a preset value, and the first index value and the second index value indicate the frequency offsets that may be included in the first set; and determine the first frequency offset based on the second index value.

Optionally, with reference to the second possible implementation of the seventh aspect, in a seventh possible implementation, the first frequency offset is determined based on a first quantity of time-frequency resources, the first quantity of time-frequency resources and a second quantity of time-frequency resources correspond to the frequency offsets that may be included in the first set, the first quantity of time-frequency resources is a quantity of time-frequency resources closest to the second quantity of time-frequency resources, and the second quantity of time-frequency resources is a quantity of time-frequency resources corresponding to a CORESET 0 of the second-type terminal device.

Optionally, with reference to the seventh aspect or the first to the seventh possible implementations of the seventh aspect, in an eighth possible implementation, the processor is further configured to: determine a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the eighth possible implementation of the seventh aspect, in a ninth possible implementation, first time resources corresponding to the same SSB are distributed in two consecutive slots in a radio frame.

Optionally, with reference to the seventh aspect or the first to the seventh possible implementations of the seventh aspect, in a tenth possible implementation, the processor is further configured to determine a time resource of a first control resource set 0 CORESET 0 corresponding to the first-type terminal device, where a first time resource may be included in a second time resource.

Optionally, with reference to the seventh aspect or the first to the seventh possible implementations of the seventh aspect, in an eleventh possible implementation, the processor is further configured to determine a time resource of a first control resource set 0 CORESET 0 corresponding to the first-type terminal device, where a first time resource may be included in a time resource of the synchronization signal block SSB.

Optionally, with reference to the eighth to the tenth possible implementations of the seventh aspect, in a twelfth possible implementation, the first time resource is determined based on second configuration information from the network device, and the second configuration information is used to configure the second time resource.

An eighth aspect of this application provides an apparatus for determining an initial downlink bandwidth part BWP. The apparatus may include: a processor, configured to: execute a program stored in a memory; and when the program stored in the memory is executed, determine a frequency resource of an initial BWP corresponding to a first-type terminal device, where the frequency resource of the first initial BWP does not overlap a frequency resource of a second initial BWP, and the first-type terminal device and a second-type terminal device have different capabilities; and a communication interface, where the communication interface is coupled to the processor, and is configured to transmit signaling and/or data to a network device based on the frequency resource of the first initial BWP.

Optionally, with reference to the eighth aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the eighth aspect or the first possible implementation of the eighth aspect, in a second possible implementation, the processor is further configured to determine a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the second possible implementation of the eighth aspect, in a third possible implementation, first time resources corresponding to the same SSB are distributed in two consecutive slots in a radio frame.

Optionally, with reference to the eighth aspect or the first possible implementation of the eighth aspect, in a fourth possible implementation, the processor is further configured to determine a time resource of a first control resource set 0 CORESET 0 corresponding to the first-type terminal device, where a first time resource may be included in a second time resource.

Optionally, with reference to the eighth aspect or the first possible implementation of the eighth aspect, in a fifth possible implementation, the processor is further configured to determine a time resource of a first control resource set 0 CORESET 0 corresponding to the first-type terminal device, where a first time resource may be included in a time resource of the synchronization signal block SSB.

Optionally, with reference to the second to the fourth possible implementations of the eighth aspect, in a sixth possible implementation, the first time resource is determined based on second configuration information from the network device, and the second configuration information is used to configure the second time resource.

A ninth aspect of this application provides an apparatus for determining an initial downlink bandwidth part BWP. The apparatus may include: a processor, configured to: execute a program stored in a memory; and when the program stored in the memory is executed, determine a frequency resource of an initial BWP corresponding to a first-type terminal device, where the frequency resource of the first initial BWP does not overlap a frequency resource of a synchronization signal block SSB, and the first-type terminal device and a second-type terminal device have different capabilities; and a communication interface, where the communication interface is coupled to the processor, and is configured to transmit signaling and/or data to a network device based on the frequency resource of the first initial BWP.

Optionally, with reference to the ninth aspect, in a first possible implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

Optionally, with reference to the ninth aspect or the first possible implementation of the ninth aspect, in a second possible implementation, the processor is further configured to determine a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device.

Optionally, with reference to the second possible implementation of the ninth aspect, in a third possible implementation, first time resources corresponding to the same SSB are distributed in two consecutive slots in a radio frame.

Optionally, with reference to the ninth aspect or the first possible implementation of the ninth aspect, in a fourth possible implementation, the processor is further configured to determine a time resource of a first control resource set 0 CORESET 0 corresponding to the first-type terminal device, where a first time resource may be included in a second time resource.

Optionally, with reference to the ninth aspect or the first possible implementation of the ninth aspect, in a fifth possible implementation, the processor is further configured to determine a time resource of a first control resource set 0 CORESET 0 corresponding to the first-type terminal device, where a first time resource may be included in a time resource of the synchronization signal block SSB.

Optionally, with reference to the second to the fourth possible implementations of the ninth aspect, in a sixth possible implementation, the first time resource is determined based on second configuration information from the network device, and the second configuration information is used to configure the second time resource.

A tenth aspect of this application provides a computer-readable storage medium. The computer-readable storage medium stores instructions. When the instructions are run on a computer, the computer is enabled to perform the method for determining an initial downlink bandwidth part BWP according to any one of the first aspect or the possible implementations of the first aspect.

An eleventh aspect of this application provides a computer-readable storage medium. The computer-readable storage medium stores instructions. When the instructions are run on a computer, the computer is enabled to perform the method for determining an initial downlink bandwidth part BWP according to any one of the second aspect or the possible implementations of the second aspect.

A twelfth aspect of this application provides a computer-readable storage medium. The computer-readable storage medium stores instructions. When the instructions are run on a computer, the computer is enabled to perform the method for determining an initial downlink bandwidth part BWP according to any one of the third aspect or the possible implementations of the third aspect.

A thirteenth aspect of this application provides a computer program product including instructions. When the computer program product runs on a computer, the computer is enabled to perform the method for determining an initial downlink bandwidth part BWP according to any one of the first aspect or the possible implementations of the first aspect.

A fourteenth aspect of this application provides a computer program product including instructions. When the computer program product runs on a computer, the computer is enabled to perform the method for determining an initial downlink bandwidth part BWP according to any one of the second aspect or the possible implementations of the second aspect.

A fifteenth aspect of this application provides a computer program product including instructions. When the computer program product runs on a computer, the computer is enabled to perform the method for determining an initial downlink bandwidth part BWP according to any one of the third aspect or the possible implementations of the third aspect.

Beneficial effects of the fourth aspect, the seventh aspect, the tenth aspect, and the thirteenth aspect of this application may be considered to be the same as the beneficial effects described in the first aspect.

Beneficial effects of the fifth aspect, the eighth aspect, the eleventh aspect, and the fourteenth aspect of this application may be considered to be the same as the beneficial effects described in the second aspect.

Beneficial effects of the sixth aspect, the ninth aspect, the twelfth aspect, and the fifteenth aspect of this application may be considered to be the same as the beneficial effects described in the third aspect.

A sixteenth aspect of this application provides a communication system. The communication system may include a terminal device and a network device. The terminal device may be considered as the terminal device described in any one of the first aspect to the third aspect.

A seventeenth aspect of this application provides a chip, where the chip includes a processor and a communication interface, the processor is coupled to the communication interface, and the processor is configured to perform the method for determining an initial BWP according to any one of the first aspect to the third aspect.

The solutions provided in this application provide a new method for determining a BWP, so that system bandwidth required by a system to support terminal devices of different types is reduced.

BRIEF DESCRIPTION OF DRAWINGS

FIG. 6 is a schematic table diagram of a design manner of a frequency resource of a first initial BWP according to an embodiment of this application;

DESCRIPTION OF EMBODIMENTS

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in an appropriate circumstance, so that embodiments described herein can be implemented in another order other than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
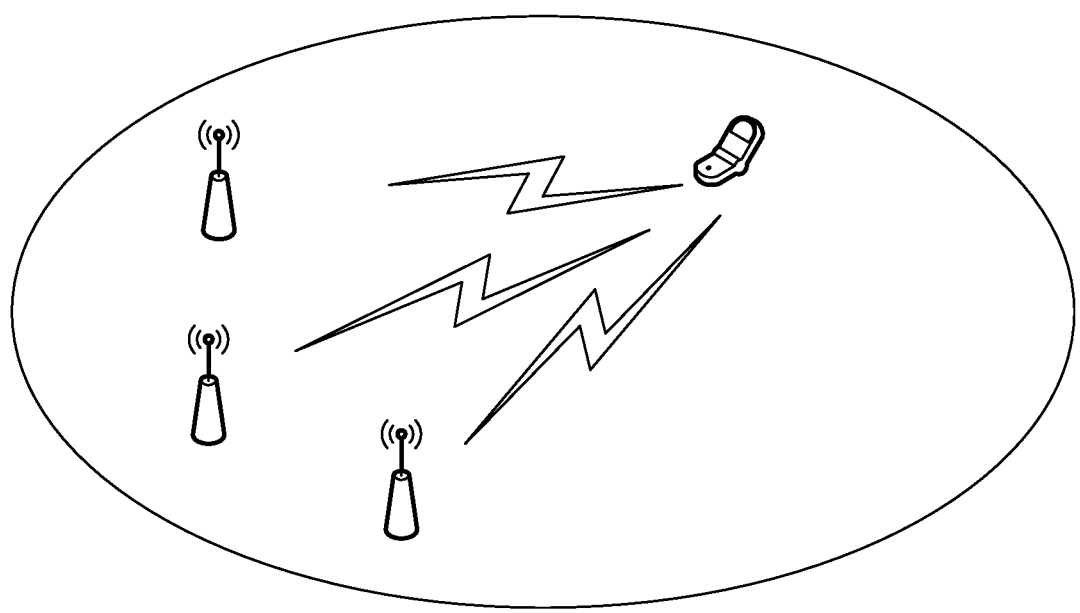
FIG. 1 is a schematic diagram of a wireless communication system applicable to an embodiment of this application.
Figure 2:
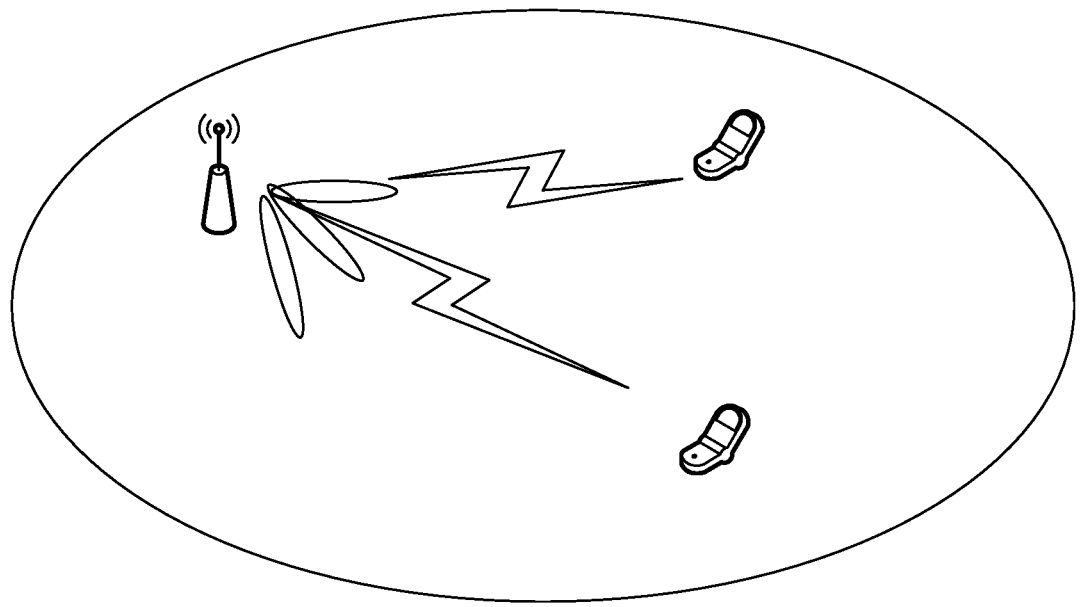
FIG. 2 is a schematic diagram of another wireless communication system applicable to an embodiment of this application.

To better understand embodiments of this application, communication systems shown in FIG. 1 and FIG. 2 are used as examples to describe in detail communication systems applicable to embodiments of this application. FIG. 1 and FIG. 2 are schematic diagrams of wireless communication systems applicable to embodiments of this application. As shown in FIG. 1, the wireless communication system may include one or more network devices. Alternatively, as shown in FIG. 2, the wireless communication system may include one or more terminal devices. In this application, the wireless communication system is sometimes referred to as a communication system for short. One network device may transmit data or control signaling to one or more terminal devices. Alternatively, a plurality of network devices may simultaneously transmit data or control signaling to one terminal device. The wireless communication system may support coordinated multipoint transmission/reception (coordinated multipoint transmission/reception, CoMP). To be specific, a plurality of cells or a plurality of network devices may coordinately participate in data transmission of one terminal device or jointly receive data sent by one terminal device, or a plurality of cells or a plurality of network devices perform coordinated scheduling or coordinated beamforming. The plurality of cells may belong to a same network device or different network devices, and may be selected based on a channel gain, a path loss, received signal strength, received signal instructions, or the like.

It should be understood that for ease of understanding, FIG. 1 or FIG. 2 shows, for example, only a network device and a terminal device. However, this should not constitute any limitation on this application. The wireless communication system may further include more or fewer network devices, and may include more terminal devices. Network devices communicating with different terminal devices may be a same network device, or may be different network devices. Quantities of network devices communicating with different terminal devices may be the same or may be different. These are not limited in this application.

Generally, when accessing a wireless communication system, for example, when accessing a long term evolution (long term evolution, LTE) system or an NR system, a terminal device first needs to synchronize with a network device in the wireless communication system. To be specific, the terminal device first determines, by detecting a synchronization signal (synchronization signal) sent by the network device, synchronization information that is for data transmission with the network device and that includes time synchronization and/or frequency synchronization information, then determines, based on the determined synchronization information, broadcast information included by the network device on a PBCH, and further reads system information (system information, SI) based on a requirement. For example, the terminal device first reads system information included in a system information block type 1 (system information block type 1, SIB1), to obtain system information necessary for data transmission with the network device. The information included in the SIB1 may be, for example, configuration information of a random access channel (random access channel, RACH) or scheduling information corresponding to another system message SI. It should be noted that, in different systems, a name of the SIB1 may be different. Herein, for ease of description, after the terminal device detects PBCHs sent by the network device, to perform data transmission with the network device, a system message that is first detected and that is sent by the network device is referred to as the SIB1. For example, in an NR system, remaining minimum system information (remaining minimum system information, RMSI) sent by the network device may also be understood as the SIB1; in an LTE system, system information that meets the foregoing features is the SIB1.

The following uses the NR system as an example to specifically describe access of the terminal device to the wireless system. Bandwidth in the NR system is wide, and is at least 100 MHz. Due to different capabilities of terminal devices, maximum bandwidth supported by the terminal devices is different. Some terminal devices may support only 80 MHz, 40 MHz, 20 MHz, or even narrower bandwidth. Therefore, usually, in NR, a concept of BWP is introduced to adapt to a requirement of a terminal device for maximum bandwidth. Specifically, the BWP is currently configured for the terminal device, to adapt to the maximum bandwidth that can be supported by the terminal device. Currently, a terminal device in a radio resource control (radio resource control, RRC) idle state (idle state) or inactive state (inactive state) needs to receive system information (system information, SI) before entering a radio resource control connected (RRC-connected) state based on the SI. Specifically, the network device broadcasts a synchronization signal block (synchronization signal block, SSB), so that the terminal device performs camping. The SSB carries a primary synchronization signal (primary synchronization signal, PSS), a secondary synchronization signal (secondary synchronization signal, SSS), and a physical broadcast channel (physical broadcast channel, PBCH). The PBCH carries a master system information block (master information block, MIB). The MIB includes configuration information (for example, a bandwidth size, a frequency domain position, and a time-frequency resource of a control resource set (control resource set, CORESET) 0) of the CORESET 0 and configuration information (for example, time domain configuration information of a physical downlink control channel (physical downlink control channel, PDCCH)) of the PDCCH of the SIB 1. After receiving the MIB, the terminal device determines that bandwidth of an initial BWP (initial BWP) is bandwidth of the CORESET 0, then receives scheduling information of the SIB 1 on the initial BWP, and receives the SIB 1 on the initial BWP based on the scheduling information of the SIB 1. In the current NR system, the MIB carried on the PBCH includes information pdcch-ConfigSIB1. The information includes eight bits and is used to indicate the configuration information of the CORESET for scheduling the SIB1. In this application, for brevity of description, unless otherwise specified, an initial downlink BWP is an initial BWP of the terminal device in the idle mode or the inactive mode. In NR, a position and a size of a frequency resource corresponding to the CORESET 0 used to schedule the SIB 1 may be considered as those of the initial downlink bandwidth part BWP corresponding to the terminal device in the idle state or the inactive state.

Currently, in a system design of NR, a terminal device that transmits an eMBB service and a terminal device that transmits a URLLC service are mainly considered, and no special design is made for a terminal device that transmits an mMTC service. Specifically, in the system design of NR, frequency resources of initial BWPs of the terminal device that transmits the eMBB service and the terminal device that transmits the URLLC service, and time resources of CORESETs 0 of the terminal device that transmits the eMBB service and the terminal device that transmits the URLLC service are mainly considered, and no special design is made for a frequency resource and a time domain resource of an initial BWP of the terminal device that transmits the mMTC service. In addition, in some scenarios, bandwidth of the initial downlink BWP notified in NR through the PBCH may be greater than bandwidth capabilities of some terminal devices that transmit the mMTC service. Consequently, the terminal devices that transmit the mMTC service cannot access the NR system.

To resolve the foregoing technical problem, this application provides a method for determining an initial BWP.

This application relates to terminal devices of two types, and the terminal devices of two types are referred to as a first-type terminal device and a second-type terminal device in this specification. The first-type terminal device and the second-type terminal device have different capabilities. Specifically, the terminal devices of two types may have one or more of the following distinguishing features.

(1) Bandwidth capabilities are different. For example, the second-type terminal device can support data transmission with the network device by using a frequency resource with maximum bandwidth of 100 MHz on one carrier, and the first-type terminal device can support data transmission with the network device by using a frequency resource with maximum bandwidth of 20 MHz, 10 MHz, or 5 MHz on one carrier.

(2) Quantities of transmit and receive antennas are different. For example, the second-type terminal device can support 4R2T or 4R1T. The first-type terminal device supports 2R1T or 1R1T at most. In other words, terminal devices that support different quantities of transmit antennas and/or different quantities of receive antennas may be considered as terminal devices of different types.

(3) Maximum uplink transmit powers are different. For example, a maximum uplink transmit power of the second-type terminal device may be 23 dBm or 26 dBm, and a maximum uplink transmit power of the first-type terminal device may only be one of 4 dBm to 20 dBm.

(4) Protocol versions are different. For example, the second-type terminal device is a terminal device in NR Release 17 (or the first terminal device is a terminal device in NR Release 17 or later), and the first-type terminal device is a terminal device in NR Release 15 and/or NR Release 16. In this application, a terminal device in NR Release 16 or earlier may also be referred to as an NR-Legacy (NR-Legacy) terminal device.

(5) Supported carrier aggregation capabilities are different. For example, the second-type terminal device may support carrier aggregation, and the first-type terminal device does not support carrier aggregation. For another example, both the terminal devices of two types may support carrier aggregation, but a maximum quantity of carriers of which aggregation is supported by the second-type terminal device is greater than a maximum quantity of carriers of which aggregation is supported by the first-type terminal device. For example, the second-type terminal device may support aggregation of a maximum of five carriers or 32 carriers, and the first-type terminal device supports aggregation of a maximum of two carriers.

(6) Duplex capabilities are different. For example, the second-type terminal device supports full-duplex FDD, or the second-type terminal device supports both full-duplex FDD and half-duplex FDD, and the first-type terminal device supports only half-duplex FDD.

(7) Data processing time capabilities are different. A terminal device having a strong data processing time capability may be considered as the second-type terminal device, and a terminal device having a weak data processing time capability may be considered as the first-type terminal device. Different processing time capabilities may be represented by using a relationship between minimum latencies of processing data by the terminal devices of two types, or may be represented by using a relationship between maximum latencies of processing data by the terminal devices of two types, or may be represented by using a relationship between a minimum latency of processing data by a terminal device of one type and a maximum latency of processing data by a terminal device of the other type. A latency of processing data may also be represented in at least one of the following manners: a latency between receiving downlink data and sending a feedback for the downlink data, a latency between sending uplink data and receiving a feedback for the uplink data, or a latency between receiving control information and sending uplink data based on the control information. For example, a minimum latency between receiving downlink data and sending a feedback for the downlink data by a terminal device of one type is less than a minimum latency between receiving downlink data and sending a feedback for the downlink data by a terminal device of the other type, and/or a minimum latency between sending uplink data and receiving a feedback for the uplink data by a terminal device of one type is less than a minimum latency between sending uplink data and receiving a feedback for the uplink data by a terminal device of the other type, and/or a minimum latency between receiving control information and sending uplink data based on the control information by a terminal device of one type is less than a minimum latency between receiving control information and sending uplink data based on the control information by a terminal device of the other type.

(8) Processing capabilities are different. A processing capability of a terminal device herein may include at least one of the following: a quantity of hybrid automatic repeat request (hybrid automatic repeat request, HARQ) processes supported in uplink data transmission and/or downlink data transmission, a size of a soft buffer (soft buffer), highest quadrature amplitude modulation (quadrature amplitude modulation, QAM) supported in uplink data transmission and/or downlink data transmission, or the like. A terminal device having a strong processing capability may be considered as the second-type terminal device, and a terminal device having a weak processing capability may be considered as the first-type terminal device.

(9) Uplink data transmission peak rates and/or downlink data transmission peak rates are different.

Specifically, in this application, the first-type terminal device in the terminal devices of two types is an NR-light terminal device, and the second-type terminal device is a non-NR-light terminal device or a terminal device having both NR-light and non-NR-light functions (for example, an NR Release 15 terminal device and/or an NR Release 16 terminal device, or an evolved terminal device in a future wireless communication system that is not limited to an LTE terminal device or an NR terminal device). The NR-light terminal device may correspond to a terminal device with reduced capability in the foregoing distinguishing feature descriptions. Alternatively, the terminal devices of two types may be both NR-light terminal devices, and the foregoing distinguishing feature exists between the terminal devices of two types. Both the terminal devices of two types are NR-light terminal devices, maximum data transmission bandwidth of a terminal device of one type on one carrier may be 20 MHz, and maximum data transmission bandwidth of a terminal device of the other type on one carrier is 10 MHz. In addition, the NR-light terminal device may also be understood as an NR reduced capability (NR reduced capability, NR REDCAP) terminal device.

In this application, the method for determining an initial BWP provided in this application is described from three aspects. The first aspect is how to determine a frequency resource of an initial BWP. The second aspect is how to determine a time resource of a CORESET 0. The third aspect is how to determine a periodicity of a first time resource. For how to determine a frequency resource of a BWP in the first aspect, this application specifically provides three design manners of a frequency resource of a BWP. In a first manner, a frequency resource of a first initial BWP corresponding to a first-type terminal device is included in a frequency resource of a second initial BWP corresponding to a second-type terminal device. In a second manner, a frequency resource of a first initial BWP corresponding to a first-type terminal device does not overlap a frequency resource of a second initial BWP corresponding to a second-type terminal device. In a third manner, a frequency resource of a first initial BWP corresponding to a first-type terminal device does not overlap a frequency resource of a synchronization signal block SSB. For how to determine a time resource of a CORESET 0 in the second aspect, this application specifically provides three design manners. It should be noted that any one of the three design manners of a time resource may be applied in combination with any one of the foregoing three design manners of a frequency resource. For the third aspect, this application provides two design manners. It should be noted that how to determine a periodicity of a first time resource in the third aspect may be applied in combination with any one of the three design manners of a time resource provided in the second aspect. The following specifically describes a method for determining an initial BWP provided in an embodiment of this application.

It should be noted that in this application, an initial BWP may be understood as a BWP including common information transmission. The common information transmission may include at least one of the following:
 (1) system information broadcast by a network device and/or control information for scheduling transmission of the system information, where the system information may include a scheduling system information block type 1 (system information block type 1, SIB1) or other system information (system information, SI);
 (2) paging (paging) information broadcast by a network device and/or control information for scheduling transmission of the paging information; or
 (3) random access response (random access response, RAR) information broadcast by a network device.

In particular, common information included in a first initial BWP corresponds to a first-type terminal device, and common information included in a second initial BWP corresponds to a second-type terminal device. When the first-type terminal device and the second-type terminal device use related common information, it may be understood that the common information included in the first initial BWP corresponds to both the first-type terminal device and the second-type terminal device, or the common information included in the second initial BWP corresponds to both the first-type terminal device and the second-type terminal device.

In this application, one BWP includes resource blocks (resource blocks, RBs) that are consecutive in frequency, one RB includes 12 subcarriers (subcarriers), and frequency bandwidth of the BWP is not greater than frequency bandwidth corresponding to a carrier including the BWP. Currently, in an NR system, on one carrier or one serving cell, data transmission between a terminal device and a network device is implemented in one active BWP, and the network device may configure a maximum of four BWPs for the terminal device.

More specifically, for example, the initial BWP is understood as a frequency resource notified by using a MIB, for example, a frequency resource notified by using pdcch-ConfigSIB1 included in the MIB, or a frequency resource configured in SIB1 information. The SIB1 information herein includes control information for scheduling SIB1 transmission and/or SIB1 system information transmitted through a physical downlink shared channel (physical downlink shared channel, PDSCH).

(1) First design manner of a frequency resource

Figure 3:
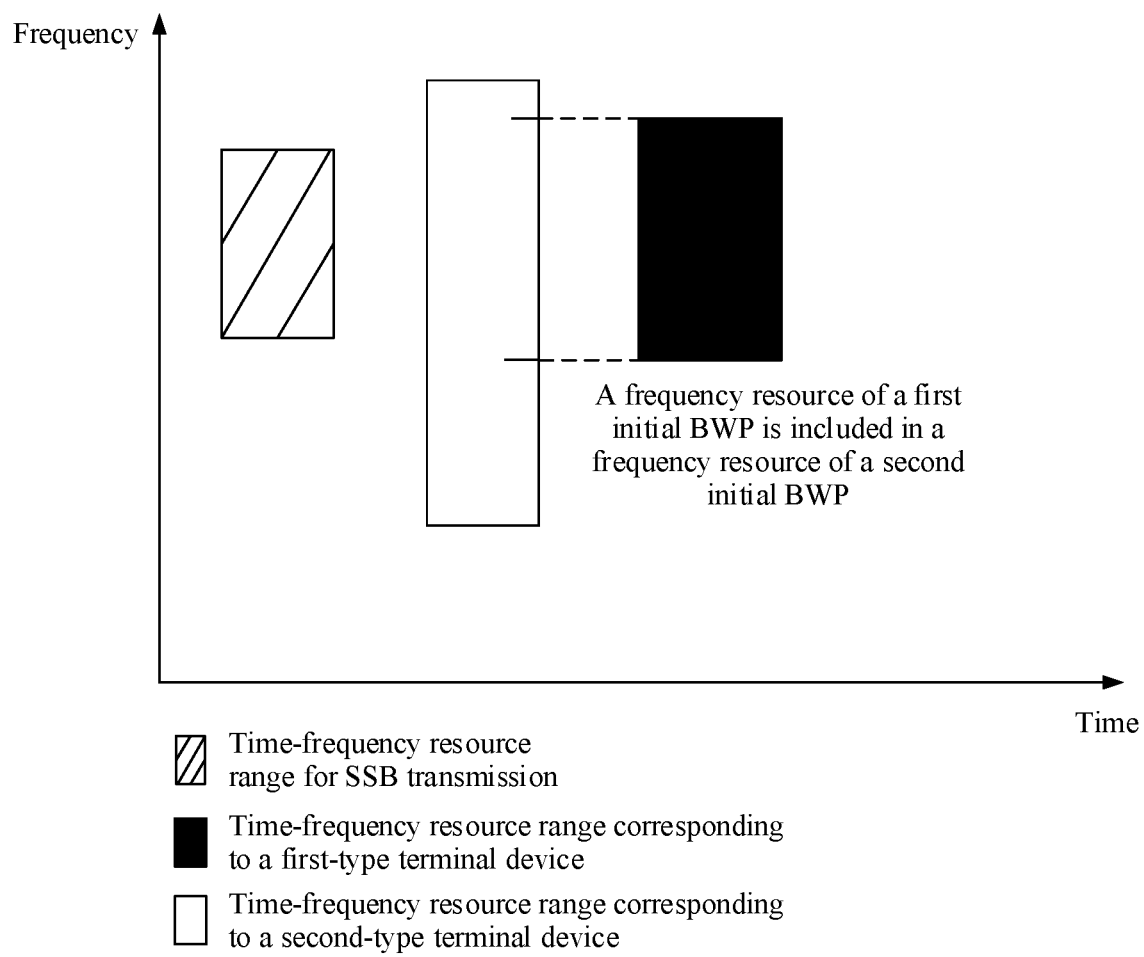
FIG. 3 is a schematic diagram of a method for determining an initial BWP according to an embodiment of this application.

FIG. 3 is a schematic diagram of a method for determining an initial BWP according to an embodiment of this application.

A horizontal axis represents time, and a vertical axis represents frequency. The figure shows a time-frequency resource range for SSB transmission, a time-frequency resource range corresponding to a first-type terminal device, and a time-frequency resource range corresponding to a second-type terminal device. Herein, the time-frequency resource range corresponding to the first-type terminal device may be understood as including data transmission corresponding to the first-type terminal device. For example, the data transmission is transmission of system information scheduling information that corresponds to the first-type terminal device and that is transmitted through a physical downlink control channel (physical downlink control channel, PDCCH), and/or transmission of system information transmitted through a PDSCH. Similarly, the time-frequency resource range corresponding to the second-type terminal device may be understood as including data transmission corresponding to the second-type terminal device. For example, the data transmission is transmission of system information scheduling information that corresponds to the second-type terminal device and that is transmitted through a PDCCH, and/or transmission of system information transmitted through a PDSCH.

In this implementation, a frequency resource of a first initial BWP corresponding to the first-type terminal device is determined, where the frequency resource of the first initial BWP is included in a frequency resource of a second initial BWP corresponding to the second-type terminal device, and the first-type terminal device and the second-type terminal device have different capabilities. "Included" in this application means that a range of the frequency resource of the second initial BWP corresponding to the second-type terminal device covers a range of the frequency resource of the first initial BWP corresponding to the first-type terminal device. The following describes this in detail. In this implementation, a frequency resource of an initial BWP corresponding to a reduced capability terminal device can be included in a frequency resource of an initial BWP corresponding to a non-reduced-capability terminal device. In this case, a network device with small system bandwidth can support data transmission of terminal devices of different types, to implement diversified data transmission. For example, both an eMBB service and an mMTC service can be supported, so that network deployment competitiveness is improved.

In a specific implementation, the frequency resource of the first initial BWP is determined based on a first frequency offset, the first frequency offset belongs to a first set, and the first set is a set of second frequency offsets. The first frequency offset is an offset of the frequency resource of the first initial BWP relative to a frequency resource of a synchronization signal block SSB, and the second frequency offset is an offset of the frequency resource of the second initial BWP relative to the frequency resource of the SSB. In other words, a set corresponding to the frequency offset between the frequency resource of the first initial BWP and the frequency resource of the SSB is a subset of the set corresponding to the frequency offset between the frequency resource of the second initial BWP and the frequency resource of the SSB. It should be noted that the synchronization signal block corresponding to the first frequency offset may be an SSB corresponding to the first-type terminal device, or may be an SSB corresponding to the second-type terminal device, and the SSB corresponding to the second frequency offset is the SSB corresponding to the second-type terminal device. For example, the second-type terminal device is a non-NR REDCAP terminal device, and an SSB corresponding to the non-NR REDCAP terminal device is a Release 15 SSB. In this case, the SSB corresponding to the first frequency offset is also the Release 15 SSB.

Optionally, a value of the first frequency offset is related to system bandwidth, a subcarrier spacing (subcarrier spacing, SCS) corresponding to SSB transmission corresponding to the first frequency offset, and an SCS corresponding to data transmission that is included in an initial BWP. The SSB corresponding to the first frequency offset represents an SSB used as a reference for determining the first frequency offset. The SCS corresponding to data transmission that is included in the initial BWP may be represented by an SCS corresponding to common information transmission that is included in the initial BWP. It should be noted that the SCS corresponding to common information transmission may be represented by an SCS corresponding to control information for scheduling the common information transmission, or may be directly represented by an SCS corresponding to the common information transmission. Herein, the SCS corresponding to the control information may be understood as an SCS used by a network device to transmit the control information. Descriptions of the SCS corresponding to the common information transmission are the same, and details are not described again. The SCS corresponding to the control information for scheduling the common information transmission may also be represented by a PDCCH SCS carrying the control information. Optionally, the PDCCH SCS herein is, for example, an SCS corresponding to a control channel that carries SIB1 scheduling information, or an SCS corresponding to a Type0-PDCCH search space set (Type0-PDCCH search space set) that includes the SIB1 scheduling information. Herein, the SIB1 scheduling information may be understood as control information for scheduling SIB1 transmission. For brevity of description, the following uses an example in which the PDCCH SCS is used to represent the SCS corresponding to data transmission that is included in the initial BWP for description.

Currently, in a 5G NR system, combinations supported by an SSB subcarrier spacing (subcarrier spacing, SCS) and an SCS of an initial BWP include: {SSB SCS, PDCCH SCS}={{15, 15}, {15, 30}, {30, 15}, {30, 30}, {120, 60}, {120, 120}, {240, 60}, {240, 120}} kHz. Combinations of {{15, 15}, {15, 30}, {30, 15}, {30, 30}} kHz are combinations that can be used when a center carrier of the NR system is below 6 GHz, and combinations of {{120, 60}, {120, 120}, {240, 60}, {240, 120}} kHz are combinations that can be used when the center carrier of the NR system is above 6 GHz. The following describes the first design manner of a frequency resource by using the combinations that can be used when the center carrier of the NR system is below 6 GHz.

In an implementation provided in this application, frequency bandwidth of the first initial BWP may be bandwidth that matches a bandwidth capability of the first-type terminal device. For example, if the bandwidth capability of the first-type terminal device is 5 MHz, the frequency bandwidth of the first initial BWP is also 5 MHz. For another example, if the first-type terminal device includes terminal devices of a plurality of bandwidth capabilities, where for example, an NR REDCAP terminal device includes terminal devices whose bandwidth capabilities are respectively 5 MHz, 10 MHz, and 20 MHz, the frequency bandwidth of the first initial BWP may be determined based on the different first-type terminal devices, or may be determined based on a minimum bandwidth capability of the first-type terminal devices, for example, 5 MHz in this example. The bandwidth of the first initial BWP may alternatively be another value. This is not specifically limited in this application. A value of the bandwidth (a bandwidth capability) of the first initial BWP may be preconfigured, for example, may be 5 MHz or 10 MHz. If the bandwidth of the first initial BWP is represented in a unit of RBs, the bandwidth may be, for example, 24 resource blocks (resource blocks, RBs) or 48 RBs. In the present invention, one RB includes an integer quantity of consecutive subcarriers, for example, includes 12 consecutive subcarriers. Alternatively, the bandwidth of the first initial BWP is notified by using a master information block (master information block, MIB) carried on a physical broadcast channel (physical broadcast channel, PBCH), or may be notified in another manner, provided that it is ensured that the first-type terminal device can support the bandwidth of the first initial BWP. How the first-type terminal device obtains the bandwidth of the first initial BWP is not specifically limited in this application, and details are not described again in the following. In addition, in this application, the bandwidth of the first initial BWP may be further described by using bandwidth of a control resource set 0 (control resource set 0, CORESET 0) including the Type0-PDCCH search space set. In the Type0-PDCCH search space set, the terminal device performs detection of at least control information scrambled by using a system information radio network temporary identifier (system information radio network temporary identifier, SI-RNTI).

Category 1: When minimum system bandwidth is 5 MHz or 10 MHz, and {SSB SCS, PDCCH SCS}={15 kHz, 15 kHz}, in the scenario of category 1, a set of second frequency offsets is {0, 2, 4, 12, 16, 38}, where {0, 2, 4, 12, 16, 38} is valued in a unit of RBs. If the first frequency offset belongs to the first set, and the first set is the set of the second frequency offsets, the first frequency offset is any one in the set {0, 2, 4, 12, 16, 38}. It should be noted that, in an actual application scenario, the second-type terminal device determines only one second frequency offset. The first set in this application is a set of frequency offsets that may be used by the second-type terminal. Details are not described below again. The following provides several specific design manners in this category scenario.

When the bandwidth of the first initial BWP corresponding to the first-typeterminal device is 24 RBs, bandwidth of the second initial BWP is 48 RBs, and the second frequency offset is 12 or 16 RB, the first frequency offset is 0 or 4.

When the bandwidth of the first initial BWP corresponding to the first-typeterminal device is 24 RBs, bandwidth of the second initial BWP is 96 RBs, and the second frequency offset is 38, the first frequency offset is 2.

When the bandwidth of the first initial BWP corresponding to the first-typeterminal device is 48 RBs, the first frequency offset is any one in a set {12, 16, 38}.

When the bandwidth of the first initial BWP corresponding to the first-typeterminal device is 96 RBs, the first frequency offset is 38.

It should be noted that, in this application, when the bandwidth of the first-typeinitial BWP is 24 RBs, a subcarrier spacing corresponding to an RB herein is the subcarrier spacing corresponding to the initial BWP, or may be represented by the PDCCH subcarrier spacing as described above. In this application, the PDCCH subcarrier spacing may be understood as the subcarrier spacing corresponding to the initial BWP. The foregoing descriptions are also applicable in the following implementations, even if the bandwidth of the first initial BWP corresponding to the first-type terminal device is not 24 RBs. Details are not described below again.

It should be noted that, in this application, a frequency offset between a frequency resource A and another frequency resource B may be represented by an RB quantity difference between an RB position corresponding to a start position of the frequency resource A and an RB position corresponding to a start position of the frequency resource B, or may be represented by an RB quantity difference between an RB position corresponding to an end position of the frequency resource A and an RB position corresponding to an end position of the frequency resource B. An RB corresponding to a start position of a frequency resource may be an RB corresponding to lowest frequency or highest frequency of the frequency resource. Correspondingly, an RB corresponding to an end position of the frequency resource may be an RB corresponding to highest frequency or lowest frequency of the frequency resource. When a frequency offset between different frequency resources is described, start positions of the different frequency resources are determined in a same measurement method, for example, by using RBs corresponding to pieces of lowest frequency or RBs corresponding to pieces of highest frequency of the frequency resources.

It should be noted that, in this application, subcarrier spacings corresponding to the different frequency resources may be different or may be the same. This is not limited. When the different frequency resources correspond to different subcarrier spacings, a quantity of RBs corresponding to the frequency offset between the different frequency resources may be represented by a quantity of RBs of either of the frequency resources.

Figure 4:
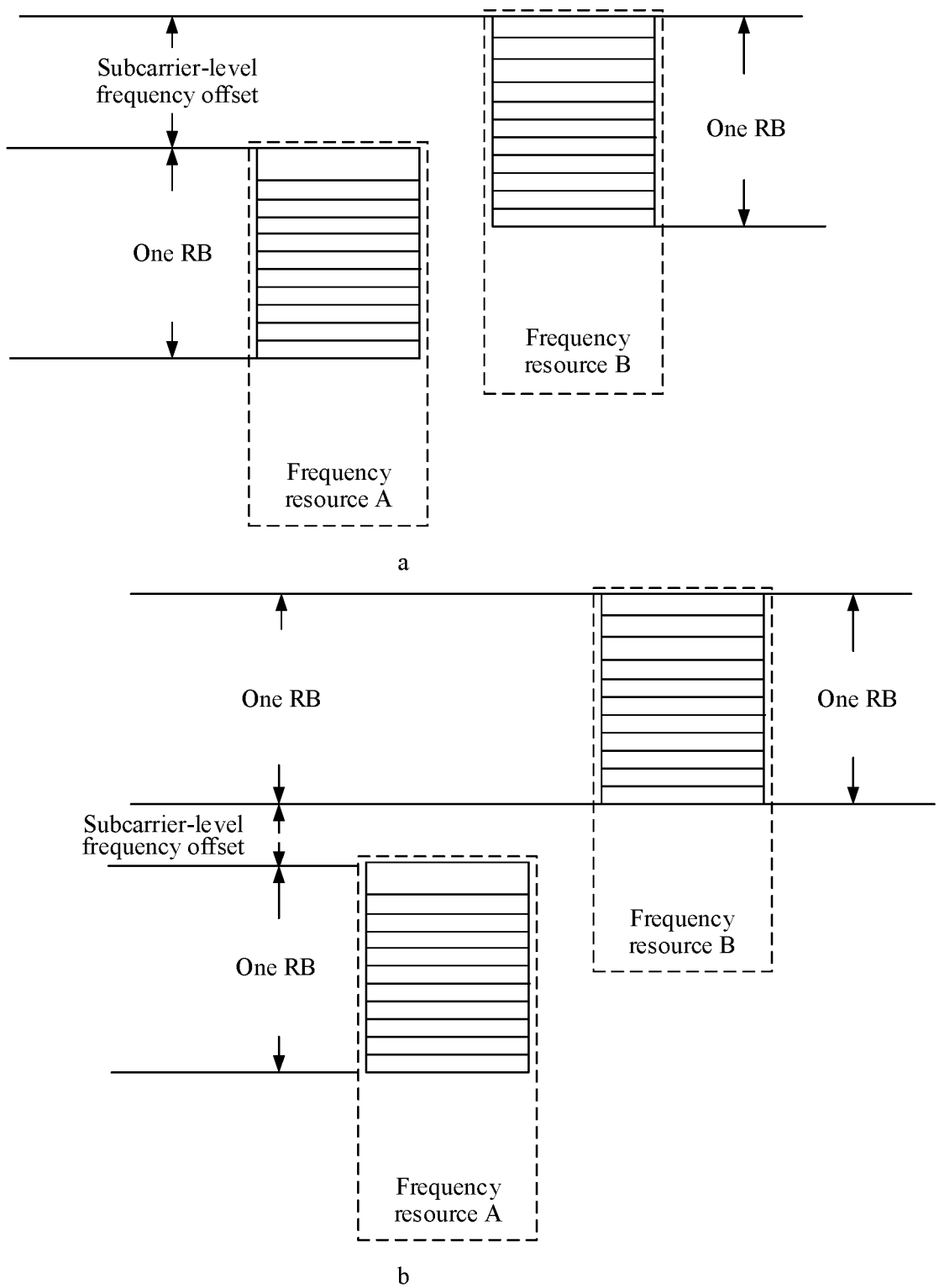
FIG. 4 is a schematic diagram of RBs of different frequency resources.

In addition, it should be noted that RB boundaries of the different frequency resources may not be aligned. As shown in a in FIG. 4, the frequency offset between the frequency resource A and the frequency resource B is less than one RB, where one RB is 12 subcarriers that are consecutive in frequency. It may be considered that the frequency offset between the frequency resource A and the frequency resource B in the case shown in a in FIG. 4 is 0 RBs. As shown in b in FIG. 4, the frequency offset between the frequency resource A and the frequency resource B is greater than one RB and fewer than two RBs. Although the RB boundaries of the different frequency resources are not aligned, it may be considered that the frequency offset between the frequency resource A and the frequency resource B in the case shown in b in FIG. 4 is one RB. The foregoing descriptions are also applicable for other parts of content in this application, and details are not described below again.

Category 2: When minimum system bandwidth is 5 MHz or 10 MHz, and {SSB SCS, PDCCH SCS}={15 kHz, 30 kHz},
  in the scenario of category 2, a set of second frequency offsets is {5, 6, 7, 8, 18, 20}, where {5, 6, 7, 8, 18, 20} is valued in a unit of RBs. If the first frequency offset belongs to the first set, and the first set is the set of the second frequency offsets, the first frequency offset is any one in the set {5, 6, 7, 8, 18, 20}. The following provides several specific design manners in this category scenario.

When bandwidth of the second initial BWP is 48 RBs and the second frequency offset is 18 RBs, the first frequency offset is either of {5, 6}.

When bandwidth of the second initial BWP is 48 RBs and the second frequency offset is 20 RBs, the first frequency offset is either of {7, 8}.

When the bandwidth of the first initial BWP corresponding to the first-typeterminal device is 48 RBs, the first frequency offset is either one in a set {18, 20}.

Category 3: When minimum system bandwidth is 5 MHz or 10 MHz, and {SSB SCS, PDCCH SCS1=130 kHz, 15 kHz},
  in the scenario of category 3, a set of second frequency offsets is {2, 6, 28}, where {2, 6, 28} is valued in a unit of RBs. If the first frequency offset belongs to the first set, and the first set is the set of the second frequency offsets, the first frequency offset is any one in the set {2, 6, 28}. The following provides several specific design manners in this category scenario.

When bandwidth of the second initial BWP is 96 RBs and the second frequency offset is 28 RBs, the first frequency offset is two RBs.

When the bandwidth of the first initial BWP corresponding to the first-type terminal device is 96 RBs, the first frequency offset is 28.

Category 4: When minimum system bandwidth is 5 MHz or 10 MHz, and {SSB SCS, PDCCH SCS}={30 kHz, 30 kHz},
  in the scenario of category 4, a set of second frequency offsets is {0, 1, 2, 3, 4, 12, 17, 16}, where {0, 1, 2, 3, 4, 12, 17, 16} is valued in a unit of RBs. If the first frequency offset belongs to the first set, and the first set is the set of the second frequency offsets, the first frequency offset is any one in the set {0, 1, 2, 3, 4, 12, 17, 16}. The following provides several specific design manners in this category scenario.

When bandwidth of the second initial BWP is 48 RBs and the second frequency offset is 12, 17, and 16, the first frequency offset is 0, 2, and 4 respectively.

When the bandwidth of the first initial BWP corresponding to the first-type terminal device is 48 RBs, the first frequency offset is any one in a set {12, 17, 16}.

Category 5: When minimum system bandwidth is 40 MHz, {SSB SCS, PDCCH SCS1=130 kHz, 15 kHz},
  in the scenario of category 5, a set of second frequency offsets is {4, 0, 56}, where {4, 0, 56} is valued in a unit of RBs. If the first frequency offset belongs to the first set, and the first set is the set of the second frequency offsets, the first frequency offset is any one in the set {4, 0, 56}. The following provides several specific design manners in this category scenario.

When the bandwidth of the first initial BWP corresponding to the first-type terminal device is 96 RBs, the first frequency offset is either of {0, 56}.

Category 6: When minimum system bandwidth is 40 MHz, and {SSB SCS, PDCCH SCS}={30 kHz, 30 kHz},
  in the scenario of category 6, a set of second frequency offsets is {0, 4, 28}, where {0, 4, 28} is valued in a unit of RBs. If the first frequency offset belongs to the first set, and the first set is the set of the second frequency offsets, the first frequency offset is any one in the set {0, 4, 28}. The following provides several specific design manners in this category scenario.

When the bandwidth of the first initial BWP corresponding to the first-type terminal device is 48 RBs, the first frequency offset is either of {0, 28}.

In the foregoing implementation, a nesting relationship between a frequency resource of the first initial BWP and a frequency resource of the second initial BWP can be implemented, to reduce system bandwidth required by a system to support diversified terminal devices. In addition, a specific value of the first frequency offset is determined based on different values of the second frequency offset in a design, and impact of different pieces of system bandwidth, synchronization rasters of different synchronization signal blocks, and the like is considered in a design of the second frequency offset, so that the specific value that is of the first frequency offset and that is determined based on the different values of the second frequency offset may have the advantage of the design of the second frequency offset, and standard design complexity may be reduced.

Figure 5:
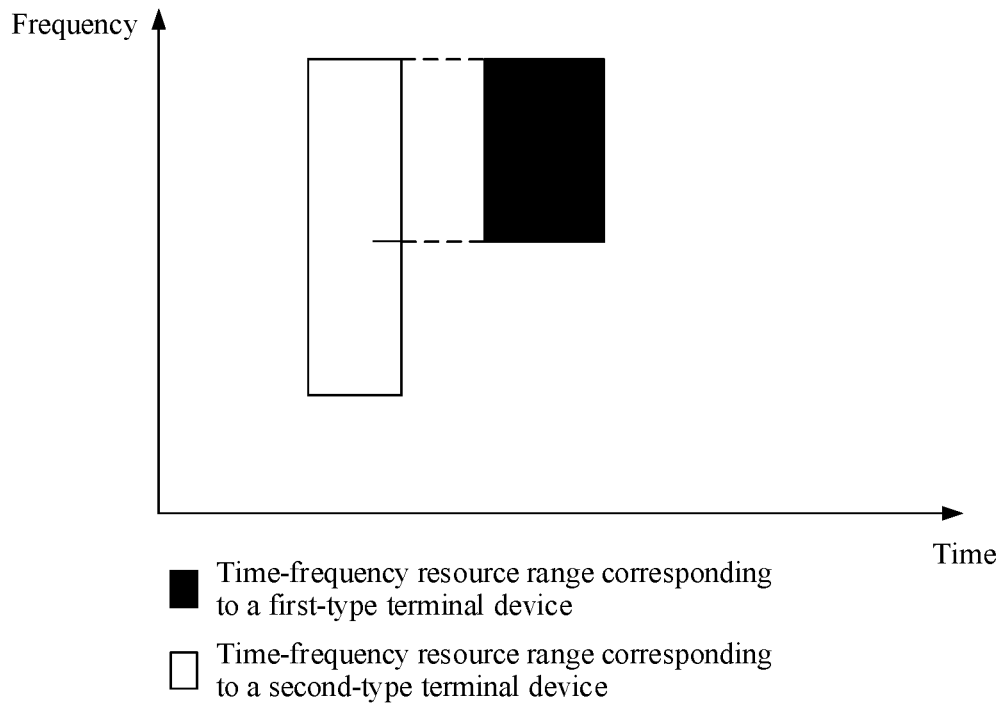
FIG. 5 is a schematic diagram of another method for determining an initial BWP according to an embodiment of this application.
Figure 5:
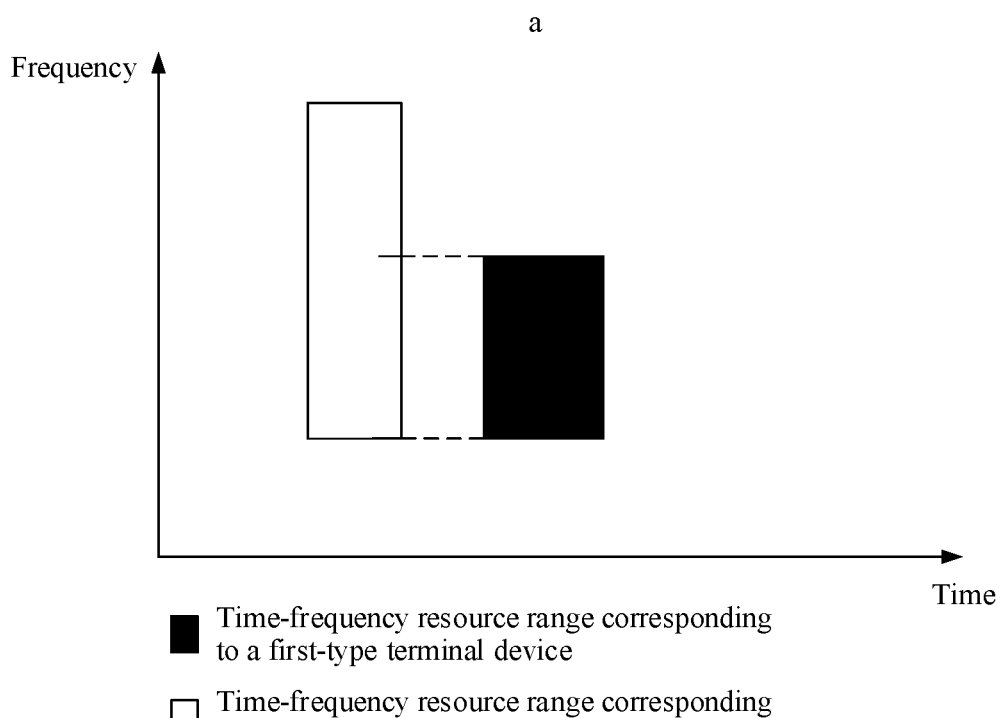

In a specific implementation, a frequency offset between the frequency resource of the first initial BWP and the frequency resource of the second initial BWP is 0, or the frequency offset between the frequency resource of the first initial BWP and the frequency resource of the second initial BWP is obtained by subtracting a value of the frequency resource of the first initial BWP from a value of the frequency resource of the second initial BWP. In other words, as shown in a in FIG. 5, an RB position corresponding to a start position of the frequency resource of the first initial BWP is the same as an RB position corresponding to a start position of the frequency resource of the second initial BWP; or as shown in b in FIG. 5, an RB position corresponding to an end position of the frequency resource of the first initial BWP is the same as an RB position corresponding to an end position of the frequency resource of the second initial BWP.

It should be noted that the first-type terminal device may determine the frequency resource of the first initial BWP in a preconfiguration manner, or the first-type terminal device may determine the frequency resource of the first initial BWP based on indication information sent by the network device. The indication information may be used to configure the frequency resource of the first initial BWP, or may be used to configure the frequency resource of the second initial BWP. The following separately describes these cases.

It should be noted that, in the first design manner of a frequency resource of the first initial BWP, the first initial BWP may include an initial uplink BWP and an initial downlink BWP. The following uses the initial downlink BWP as an example to specifically describe a manner of determining the frequency resource of the first initial BWP by the first-type terminal device.

(1) The frequency resource of the first initial BWP is determined in the preconfiguration manner.

In this manner, the first-type terminal device prestores configuration information of the frequency resource of the first initial BWP. The first-type terminal device accesses a wireless system, and may determine the configuration information of the frequency resource of the first initial BWP based on preconfigured information. The following describes this implementation with reference to FIG. 6. The foregoing describes several specific design manners in different category scenarios. As shown in FIG. 6, the foregoing several specific design manners may be presented in a form of a table. For example, a table shown in a in FIG. 6 is several specific design manners provided in the scenario corresponding to the category 1, and a table shown in b in FIG. 6 is several specific design manners provided in the scenario corresponding to the category 2. Configuration information corresponding to the first-type terminal device may be specified in advance. For example, the first-type terminal device may prestore the tables shown in FIG. 6. When accessing the wireless system, the first-type terminal device may determine the configuration information of the frequency resource of the first initial BWP according to the tables shown in FIG. 6.

It should be noted that the first-type terminal device may store only the first frequency offset as the configuration information, and the bandwidth of the first-type terminal device may be preconfigured. Alternatively, the first-type terminal device may store only the first frequency offset and the bandwidth of the first-type terminal device, and does not store bandwidth of the second-type terminal device and the second frequency offset.

(2) The first-type terminal device determines the frequency resource of the first initial BWP based on the indication information sent by the network device, where the indication information is used to configure the frequency resource of the first initial BWP.

A design of the frequency resource of the first initial BWP or a value of the first frequency offset is an inventive point of this implementation. For how the network device sends the indication information and how the terminal device determines the frequency resource of the first initial BWP based on the indication information, both solutions in a conventional technology may be used in this solution.

(3) The first-type terminal device determines the frequency resource of the first initial BWP based on the indication information sent by the network device, where the indication information is used to configure the frequency resource of the second initial BWP.

The first frequency offset is determined based on first configuration information from the network device, and the first configuration information is used to configure the frequency resource of the second initial BWP. The foregoing describes the first design manner of a frequency resource, and provides a relationship between the frequency resource of the first initial BWP corresponding to the first-type terminal device and the frequency resource of the second initial BWP corresponding to the second-type terminal device. In this implementation, the indication information sent by the network device is used to configure the frequency resource of the second initial BWP, and the first-type terminal device determines the frequency resource of the first initial BWP of the first-type terminal device based on the indication information. In this implementation, the network device does not need to additionally send, to the second-type terminal device, indication information used to determine the frequency resource of the first initial BWP. This can reduce overheads of sending control information by the network device, and save energy of the network device. In addition, this manner makes few changes in the conventional technology. The following provides several specific manners to describe how the first-type terminal device determines the frequency resource of the first initial BWP based on the indication information sent by the network device. It should be understood that, in addition to the following several specific implementations, a manner in which the first-type terminal device determines the frequency resource of the first initial BWP based on the indication information should fall within the protection scope of this application, provided that the frequency resource of the first initial BWP is included in the range of the frequency resource of the second initial BWP corresponding to the second-type terminal device.

Figure 7:
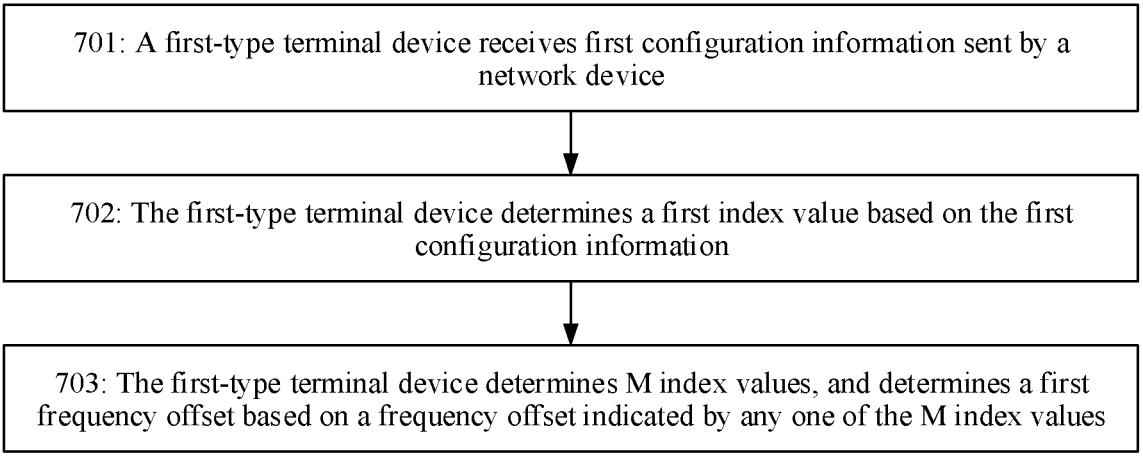
FIG. 7 is a schematic flowchart of a method for determining an initial downlink bandwidth part BWP according to an embodiment of this application.

FIG. 7 is a schematic flowchart of a method for determining an initial bandwidth part BWP according to an embodiment of this application.

The method for determining an initial bandwidth part BWP provided in this application may include the following steps.

701: A first-type terminal device receives first configuration information sent by a network device.

The first configuration information is used to configure a frequency resource of a second initial BWP.

702: The first-type terminal device determines a first index value based on the first configuration information.

For example, indication information is a MIB message. pdcch-ConfigSIB1 in the MIB indicates an index (index) in a table. For example, in a scenario of category 1, to be specific, when minimum system bandwidth is 5 MHz or 10 MHz, and {SSB SCS, PDCCH SCS}={15 kHz, 15 kHz}, pdcch-ConfigSIB1 indicates an index in the following Table 1, and an offset (offset) in the last column of the table is a second offset. Table 1 includes the number of RBs (quantity of RBs) and the number of symbols (quantity of symbols), where the number of RBs is used to indicate bandwidth of the second initial BWP, and the number of symbols is used to indicate a time resource occupied by a CORESET 0 in terms of time. It should be noted that the time resource occupied by the CORESET 0 in terms of time may appear periodically, and the number of symbols herein indicates a time resource of the CORESET 0 in one periodicity, in other words, a number of symbols occupied in terms of time. Table 1 may further include an SS/PBCH block and PDCCH CORESET multiplexing pattern (SS/PBCH block and CORESET multiplexing pattern), which is not significantly associated with this application, and therefore is not shown in Table 1.

The first-type terminal device determines the first index value based on the first configuration information. For example, if a value corresponding to pdcch-ConfigSIB1 is 7, it is determined that the index is 7, that is, the first index value is 7.

TABLE 1

| Index | Number of RBs | Number of symbols | Offset (RBs) |
|---|---|---|---|
| 0 | 24 | 2 | 0 |
| 1 | 24 | 2 | 2 |
| 2 | 24 | 2 | 4 |
| 3 | 24 | 3 | 0 |
| 4 | 24 | 3 | 2 |

TABLE 1-continued

| Index | Number of RBs | Number of symbols | Offset (RBs) |
|---|---|---|---|
| 5 | 24 | 3 | 4 |
| 6 | 48 | 1 | 12 |
| 7 | 48 | 1 | 16 |
| 8 | 48 | 2 | 12 |
| 9 | 48 | 2 | 16 |
| 10 | 48 | 3 | 12 |
| 11 | 48 | 3 | 16 |
| 12 | 96 | 1 | 38 |
| 13 | 96 | 2 | 38 |
| 14 | 96 | 3 | 38 |
| 15 | Reserved | | |

703: The first-type terminal device determines M index values, and determines a first frequency offset based on a frequency offset indicated by any one of the M index values.

M is a positive integer. The M index values and the first index value are used to indicate frequency offsets included in a first set. For example, in Table 1, the first set is {0, 2, 4, 12, 16, 38}. The M index values are all less than or equal to an index value of the first index value. The first-type terminal device determines the first frequency offset based on the frequency offset indicated by any one of the M index values. For example, if the first-type terminal device determines, based on the first configuration information, that the first index value is 7, in Table 1, index values less than 7 are 0 to 6, and therefore M is 7. In this case, a frequency offset indicated by the index value 0 is 0, a frequency offset indicated by the index value 1 is 2, a frequency offset indicated by the index value 2 is 4, a frequency offset indicated by the index value 3 is 0, a frequency offset indicated by the index value 4 is 2, a frequency offset indicated by the index value 5 is 4, and a frequency offset indicated by the index value 6 is 12. Therefore, the first frequency offset may be any one of {0, 2, 4, 12}.

Figure 8:
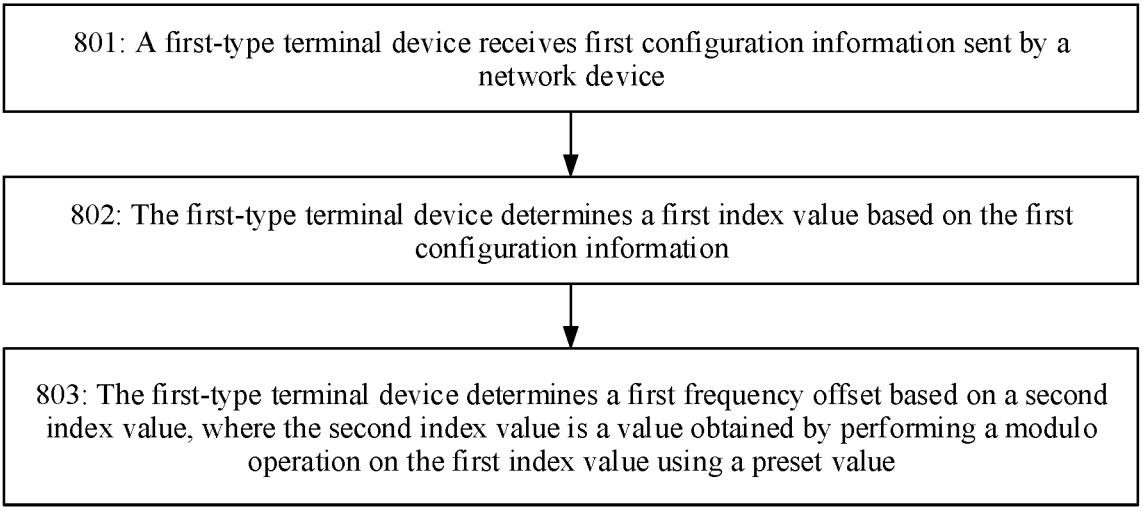
FIG. 8 is a schematic flowchart of another method for determining an initial downlink bandwidth part BWP according to an embodiment of this application.

FIG. 8 is a schematic flowchart of another method for determining an initial bandwidth part BWP according to an embodiment of this application.

The method for determining an initial downlink bandwidth part BWP provided in this application may include the following steps.

801: A first-type terminal device receives first configuration information sent by a network device.

802: The first-type terminal device determines a first index value based on the first configuration information.

For understanding of step 801 and step 802, refer to step 701 and step 702 in the embodiment corresponding to FIG. 7. Details are not described herein again.

803: The first-type terminal device determines a first frequency offset based on a second index value, where the second index value is a value obtained by performing a modulo operation on the first index value using a preset value.

The first-type terminal device determines the second index value, where the second index value is the value obtained by performing the modulo operation on the first index value using the preset value, and the first index value and the second index value indicate frequency offsets included in a first set.

The following describes this implementation by using a scenario described in category 1 as an example. A value corresponding to pdcch-ConfigSIB1 is the first index value, and the modulo operation is performed on the first index value using the preset value. Optionally, in this implementation, the preset value may be a total quantity of configurations corresponding to initial BWP bandwidth that is included in the table including the first index value and that is not greater than bandwidth of a first initial BWP corresponding to the first-type terminal device.

For example, in the scenario corresponding to category 1, it is assumed that the bandwidth of the first initial BWP is 24 RBs. In this case, as shown in Table 1, the preset value may be 6 (namely, a quantity of all pieces of configuration information corresponding to index values 0 to 5). The first-type terminal device may determine distribution of a frequency resource of the first initial BWP based on a modulo result with reference to Table 1. For example, if the first index value is 9, a result of a modulo operation on 9 using 6 (9 mod 6) is 3, and the first-type terminal device may determine that the first frequency offset is a frequency offset corresponding to the index value 3 in Table 1, that is, 0.

In the scenario corresponding to category 1, it is assumed that the bandwidth of the first initial BWP is not greater than 48 RBs. In this case, as shown in Table 1, the preset value may be 12 (namely, a quantity of all configurations corresponding to index values 0 to 11). The first-type terminal device may determine distribution of a frequency resource of the first initial BWP based on a modulo result with reference to Table 1. For example, if the first index value is 13, a result of a modulo operation on 13 using 12 (13 mod 12) is 1, and the first-type terminal device may determine that the first frequency offset is a frequency offset corresponding to the index value 1 in Table 1, that is, two RBs.

In a specific implementation, the first frequency offset is determined based on a first quantity of time-frequency resources, the first quantity of time-frequency resources and a second quantity of time-frequency resources correspond to the frequency offsets included in the first set, the first quantity of time-frequency resources is a quantity of time-frequency resources closest to the second quantity of time-frequency resources, and the second quantity of time-frequency resources is a quantity of time-frequency resources corresponding to a CORESET 0 of a second-type terminal device.

The following describes this implementation by using the scenario described in category 1 as an example. The first-type terminal device determines, based on pdcch-ConfigSIB1, that a second quantity of time-frequency resources corresponding to a CORESET 0 included in a second initial BWP is 48 RBs*1 OFDM symbol. Assuming that bandwidth of the first-type terminal device is 24 RBs, the first-typeterminal device may determine, based on Table 1, that when a first quantity of time-frequency resources corresponding to a CORESET 0 included in the first initial BWP is 24 RBs*2 OFDM symbols, the first quantity of time-frequency resources is closest to the second quantity of time-frequency resources. With reference to Table 1, when the quantity of time-frequency resources corresponding to the CORESET 0 included in the initial BWP is 24 RBs*2 OFDM symbols, a corresponding frequency offset (the offset in the table) may be 0, 2, or 4. In this case, the first frequency offset may be any value in {0, 2, 4}. Optionally, for example, the first frequency offset may be preconfigured as a frequency offset corresponding to a smallest index value in {0, 2, 4}, or a smallest value in frequency offsets. For example, the first frequency offset is preconfigured as 0.

For another example, when the first-type terminal device determines, based on pdcch-ConfigSIB1, that a time-frequency resource corresponding to a CORESET 0 included in a second initial BWP is 48 RBs*2 OFDM symbols or more, the first-type terminal device may determine that a quantity of time-frequency resources corresponding to a CORESET 0 included in the first initial BWP is 24 RBs*3 OFDM symbols. With reference to Table 1, when the quantity of time-frequency resources corresponding to the CORESET 0 included in the first initial BWP is 24 RBs*3 OFDM symbols, a corresponding frequency offset (the offset in the table) may be 0, 2, or 4. In this case, the first frequency offset may be any value in {0, 2, 4}. For example, in a specific implementation, the first frequency offset may be preconfigured as a frequency offset corresponding to a smallest index value in {0, 2, 4}, or a smallest value in frequency offsets. For example, the first frequency offset is preconfigured as 0.

(2) Second design manner of a frequency resource

Figure 9:
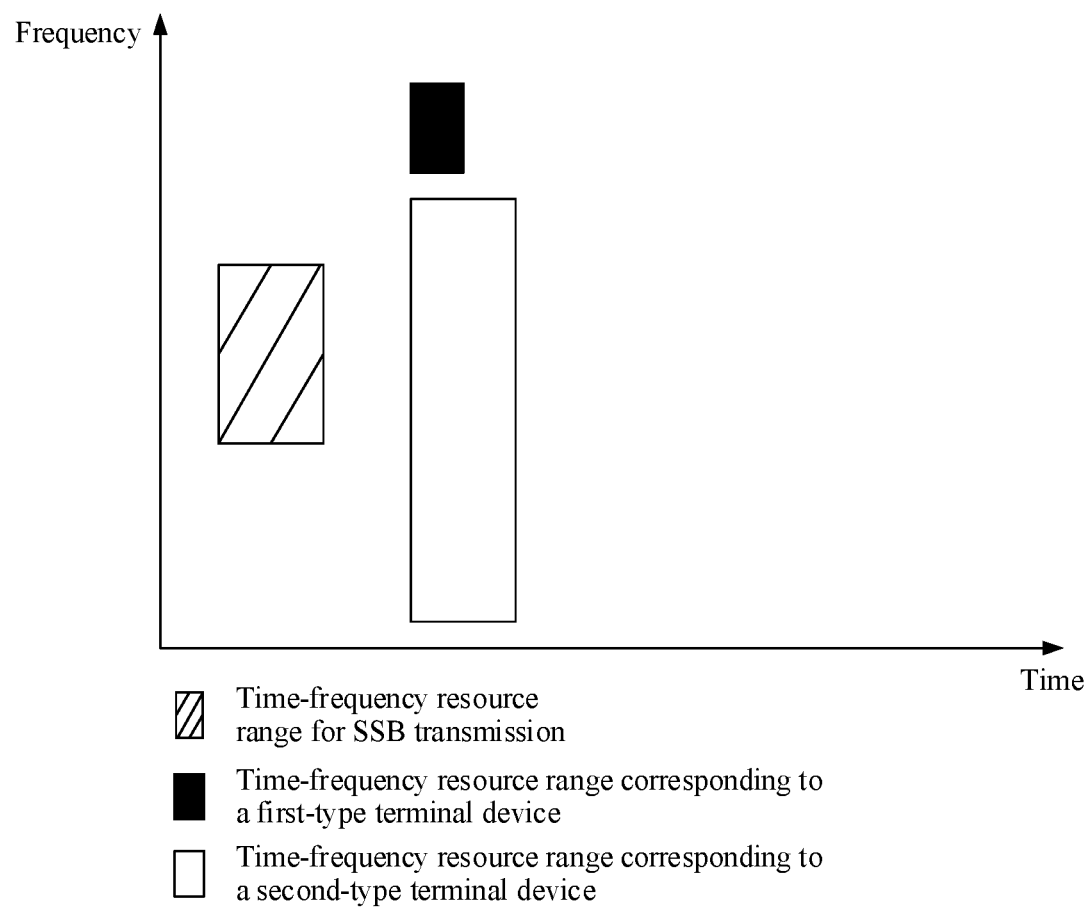
FIG. 9 is a schematic diagram of another method for determining an initial BWP according to an embodiment of this application.

FIG. 9 is a schematic diagram of a method for determining an initial BWP according to an embodiment of this application.

A first-type terminal device determines a frequency resource of an initial BWP corresponding to the first-type terminal device, where the frequency resource of the first initial BWP does not overlap a frequency resource of a second initial BWP, and the first-type terminal device and a second-type terminal device have different capabilities.

In this implementation, because the frequency resource of the first initial BWP does not overlap the frequency resource of the second initial BWP, impact on data transmission of the second-type terminal device can be reduced. For a system with large system bandwidth, in this implementation, diversified data services can be supported (for example, both an eMBB service and an mMTC service are supported) without affecting a deployed eMBB service.

In a specific implementation, bandwidth of the first initial BWP may be predefined as bandwidth of the first-type terminal device, for example, 5 MHz. A frequency offset between the frequency resource of the first initial BWP and the frequency resource of the second initial BWP may be predefined, or may be implemented in another manner. This is not specifically limited. For example, the frequency offset between the frequency resource of the first initial BWP and the frequency resource of the second initial BWP is one RB. In this way, not only diversified data services can be supported as described above, but also system bandwidth that supports the diversified data services can be minimized.

It should be noted that, in the second design manner of a frequency resource of the first initial BWP, the first initial BWP may include an initial uplink BWP and an initial downlink BWP.

(3) Third design manner of a frequency resource

Figure 10:
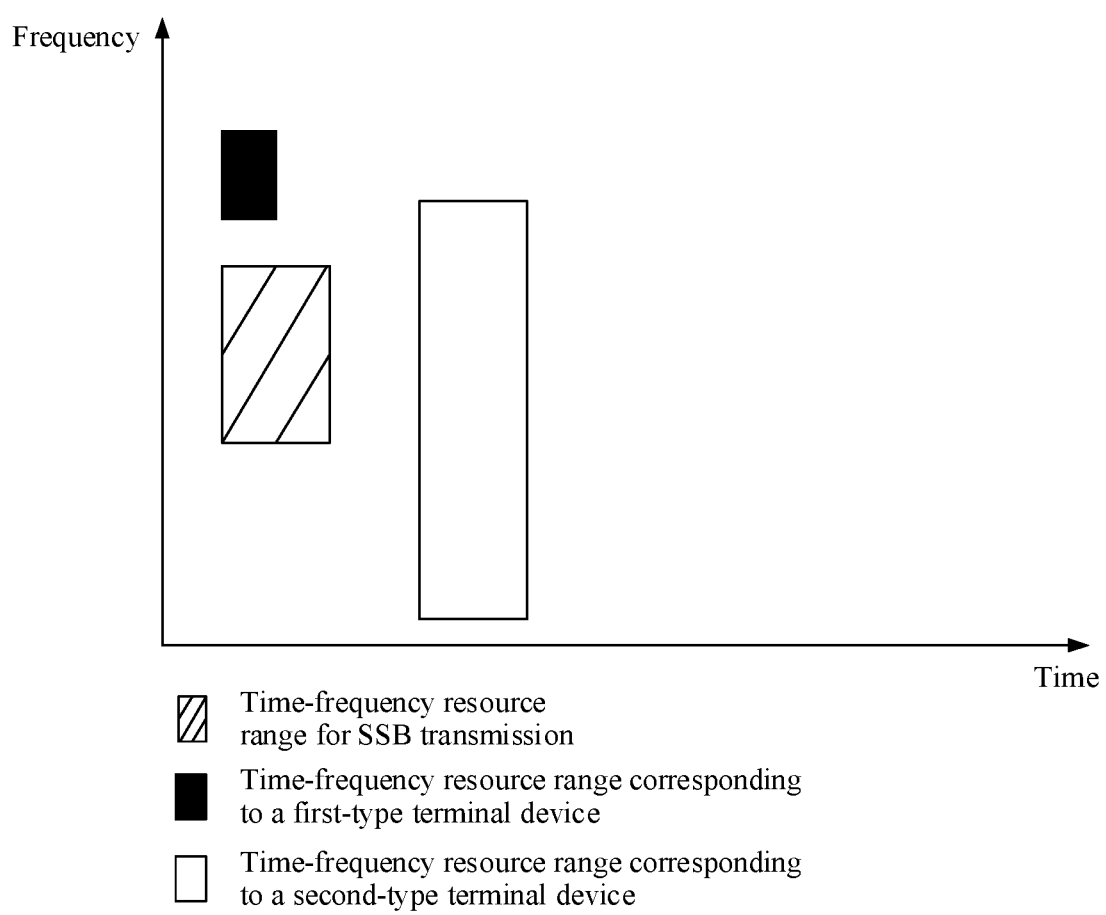
FIG. 10 is a schematic diagram of another method for determining an initial BWP according to an embodiment of this application.

FIG. 10 is a schematic diagram of a method for determining an initial BWP according to an embodiment of this application.

A first-type terminal device determines a frequency resource of an initial BWP corresponding to the first-type terminal device, where the frequency resource of the first initial BWP does not overlap a frequency resource of a synchronization signal block SSB, and the first-type terminal device and a second-type terminal device have different capabilities.

Further, optionally, in this implementation, the frequency resource of the first initial BWP does not overlap the frequency resource of the SSB, and is further included in a frequency resource of a second initial BWP.

In this implementation, a system frequency resource can be effectively used. This is particularly applicable to a system that has small system bandwidth but needs to serve diversified services.

In a specific implementation, a frequency offset between the frequency resource of the first initial BWP and the frequency resource of the SSB may be predefined, and bandwidth of the first initial BWP may be predefined as bandwidth of the first-type terminal device, for example, 5 MHz, or may be another value. This is not specifically limited.

It should be noted that, in this application, the frequency resource of the first initial BWP may be represented by a frequency resource position of the first initial BWP, and may be specifically represented by using a frequency start point of the first initial BWP and the bandwidth of the first initial BWP, or a frequency end point of the first initial BWP and the bandwidth of the first initial BWP. Same descriptions are provided for the second initial BWP. This is not specifically limited in embodiments of this application.

It should be noted that the foregoing implementation may also be used for a method for determining a frequency resource, of the first initial BWP, whose NR carrier frequency is greater than 6 GHz.

The foregoing describes the three design manners of a frequency resource provided in embodiments of this application. The following describes how to determine a time resource of a CORESET 0.

It should be noted that, in embodiments of this application, the CORESET 0 may be understood as above, or may be understood as a control resource set CORESET including transmission of scheduling information. The scheduling information is control information used to schedule common information transmission included in an initial BWP. For example, the CORESET 0 is a time-frequency resource set including transmission of a SIB1 PDCCH, a time-frequency resource set including transmission of a paging PDCCH, and/or a time-frequency resource set including transmission of a RAR PDCCH. The SIB1 PDCCH is a physical downlink control channel carrying control information for scheduling SIB1 transmission, the paging PDCCH is a physical downlink control channel carrying control information for scheduling paging transmission, and the RAR is a physical downlink control channel carrying information for RAR scheduling. A frequency resource of the CORESET 0 may be equivalent to a frequency resource of the initial BWP, and a time resource of the CORESET 0 may be indicated by a time position at which a PDCCH search space (search space, SS) or a PDCCH search space set search space set associated with the CORESET 0 appears. Herein, that the PDCCH SS or the PDCCH search space set is associated with the CORESET 0 may be understood as follows: The frequency resource corresponding to the CORESET 0 includes a configuration of the PDCCH SS or the PDCCH search space set. The search space set may be understood as a set including a group of PDCCH candidates on which a terminal device needs to perform detection. On the PDCCH candidate, the terminal device may detect control information for scheduling data transmission of the terminal device, or may not detect the control information. This depends on whether the network device sends, on the PDCCH candidate, the control information for scheduling the data transmission of the terminal device. The control information herein may be cell-specific control information, or may be terminal device-specific control information. This is not specifically limited in embodiments of this application.

More specifically, the time resource of the CORESET 0 may be understood as, for example, a time resource notified by using pdcch-ConfigSIB1 included in a MIB, that is, a time resource corresponding to a Type0-PDCCH search space set.

For ease of description, the time resource corresponding to the CORESET 0 is used for description in the following.

(1) First design manner of a time resource of a CORESET 0

In this implementation, a time resource corresponding to a CORESET 0 corresponding to a first initial BWP is determined.

A radio frame in which time resources of a first CORESET 0 corresponding to a first-type terminal device are located does not include a time resource for transmitting a synchronization signal block SSB, or a slot (slot) in which a first time resource is located does not include a time resource of a second CORESET 0 corresponding to a second-type terminal device.

Optionally, first time resources corresponding to different beam directions are preferably mapped to a radio frame that does not include the time resource for transmitting the SSB, and are sequentially mapped, in ascending order of SSB indexes associated with the first time resources, to slots sorted in ascending order of slot indexes, where the slot to which the first time resource is mapped does not include the time resource of the second CORESET 0. It should be noted that first time resources at different time positions may correspond to a same beam direction, or may correspond to different beam directions. This is not specifically limited. An advantage of this implementation is that, when a system starts to support service transmission of the first-type terminal device, service transmission of the second-type terminal device that may have been deployed in the system is not affected by the introduction of the first-type terminal device. Particularly, when common information transmission corresponding to the second-type terminal device and SSB transmission are performed in a same slot or a same radio frame, in this implementation, impact on initial access of the second-type terminal device can be avoided. Herein, for example, the first-type terminal device is an NR REDCAP terminal device, and the second-type terminal device is an eMBB terminal device (for example, an NR R15/R16 terminal device) that has been deployed in NR.

When there are insufficient slots that are in the radio frame not including the time resource for transmitting the SSB and that do not include the time resource of the second CORESET 0 to support mapping of first time resources corresponding to all beam directions, first time resources that have not been mapped continue to be mapped to slots that are in a radio frame including the time resource for transmitting the SSB and that do not include the time resource of the second CORESET 0.

In a specific implementation, first time resources corresponding to a same SSB are distributed in two consecutive slots in a radio frame. In other words, a plurality of first time resources that have a same quasi colocation (quasi colocation, QCL) relationship with one SSB are distributed in consecutive slots in one radio frame. In this implementation, joint channel estimation performance of control information that is for scheduling common information transmission and that is transmitted in the plurality of first time resources can be ensured, so that a terminal device implements combination detection performance. For example, if first time resources corresponding to a same SSB index are distributed in two consecutive slots, preferably, the slots in which the first time resources corresponding to the same SSB index are located are in a same radio frame and are two consecutive slots, so that the terminal device continuously performs, in terms of time, detection of SIB1 control information included in CORESETs 0 corresponding to the same SSB index, to ensure channel estimation performance.

In this application, that first time resources correspond to different beam directions may be understood as follows: If SSB indexes associated with CORESETs 0 are different, the CORESETs 0 correspond to different beam directions. To be specific, different beam directions may be distinguished by using SSB indexes. If the SSB indexes are different, it is considered that beam directions corresponding to CORESETs 0 associated with SSBs are different. Even in practice, data in a same beam direction sent by a network device by using different SSB indexes may be considered as data in different beam directions in this application.

In a specific implementation, the first time resource is determined based on second configuration information from the network device, and the second configuration information is used to configure a second time resource. The following provides descriptions with reference to a specific example.

The first time resource may be determined according to the following formula:

$$n_g = ((0 \times 2^u + [L \times M]) \bmod N_{slot}^{frame,u} + 1) + \text{offset} + [i \times M]) \bmod N_{slot}^{frame,u}$$

The second configuration information may be a MIB message, and manners of determining parameters are as follows.

The parameter O and the parameter M may be directly determined based on an indication of pdcch-ConfigSIB1 included in the MIB.

L is a maximum quantity of SSBs that can be transmitted in a frequency band of the SSBs. In an NR system, an SSB is periodically sent every half-frame of 5 ms, and half-frame periodicities including the SSB may be {5 ms, 10 ms, 20 ms, 40 ms, 80 ms, 160 ms}. In one half-frame, the SSB may be repeatedly sent for a plurality of times, and a maximum quantity of repetitions is L. A value of L is determined by a frequency band of an NR carrier.

Offset' represents a time offset, and is a preconfigured value, or is indicated by the second configuration information.

i represents an index of the SSB corresponding to the time resource of the first CORESET 0.

A value of M' may be the same as that of M.

u corresponds to different subcarrier spacings or different numerologies (numerologies). For a value of u, refer to Table 2.

TABLE 2

| μ | Subcarrier spacing Δf = $2^μ \cdot 15$ [kHz] |
|---|---|
| 0 | 15 |
| 1 | 30 |
| 2 | 60 |
| 3 | 120 |
| 4 | 240 |

An index of a radio frame in which the slot obtained through calculation is located may be determined depending on whether an index of the slot is an odd number or an even number, or the slot obtained through calculation is preferably in a radio frame that does not include NR SSB transmission.

In a specific implementation, a time resource (for example, a slot) in which the first time resource is located may alternatively be determined according to the following formula:

$$n_0 = (O \cdot 2^u + [i \cdot M]) \bmod N_{slot}^{format,u}$$

The first-type terminal device determines values of the parameters O and M in the foregoing formula based on pdcch-ConfigSIB1 included in a MIB, and then determines, based on a predefined time offset and nO obtained through calculation according to the foregoing formula, the slot in which the first time resource is located. The time offset herein may be understood as a time offset between the first time resource and a second time resource that correspond to a same SSB index. For example, if O indicated by pdcch-ConfigSIB1 is 0, the predefined time offset may be 5. For another example, regardless of a specific value of 0 indicated by pdcch-ConfigSIB1, the time offset may always be 5. Alternatively, the first-type terminal device determines, based on control information, values of the parameters O and M in the foregoing formula, and directly determines, based on a predefined value of $N_{slot}^{frame,\mu}$, the slot in which the first time resource is located. A specific transmission manner of the control information and a transmission channel for carrying the control information are not specifically limited in embodiments of this application. Similarly, an index of a radio frame in which the slot obtained through calculation in this manner is located may be determined depending on whether an index of the slot is an odd number or an even number, or the slot obtained through calculation is preferably in a radio frame that does not include NR SSB transmission.

It should be noted that in the technical solutions provided in this application, first configuration information and the second configuration information may be same information, or first configuration information and the second configuration information may be different information, but are carried on a same downlink data transmission channel. For example, the downlink data transmission channel may include but is not limited to a broadcast channel, downlink control information, or a downlink shared channel. Details are not described below again.

It should be noted that, in embodiments of this application, the first time resource and the time resource including SSB transmission may be time-division multiplexed (time-division multiplexed, TDMed), in other words, the first time resource and the time resource including SSB transmission do not overlap in terms of time. For example, the time resource including SSB transmission and the first time resource correspond to different slots, or correspond to different OFDM symbols.

(2) Second design manner of a time resource of a CORESET 0

A time resource of a first control resource set 0 CORESET 0 corresponding to a first-type terminal device is determined, where a first time resource is included in a second time resource.

In a preferred implementation, the implementation may be jointly used with the frequency resource that is of the first initial BWP and that is determined in the first or the second design manner of frequency in the foregoing descriptions.

It should be noted that, in embodiments of this application, the first time resource and a time resource including SSB transmission may be TDMed, in other words, the first time resource and the time resource including SSB transmission do not overlap in terms of time. For example, the time resource including SSB transmission and the first time resource correspond to different slots, or correspond to different OFDM symbols.

(3) Third design manner of a time resource of a CORESET 0

A time resource of a first control resource set 0 CORESET 0 corresponding to a first-type terminal device is determined, where a first time resource is included in a time resource of a synchronization signal block SSB.

It should be noted that the SSB corresponding to the first-type terminal device may be the same as or different from an SSB corresponding to a second-type terminal device. This is not specifically limited in this application.

Figure 11:
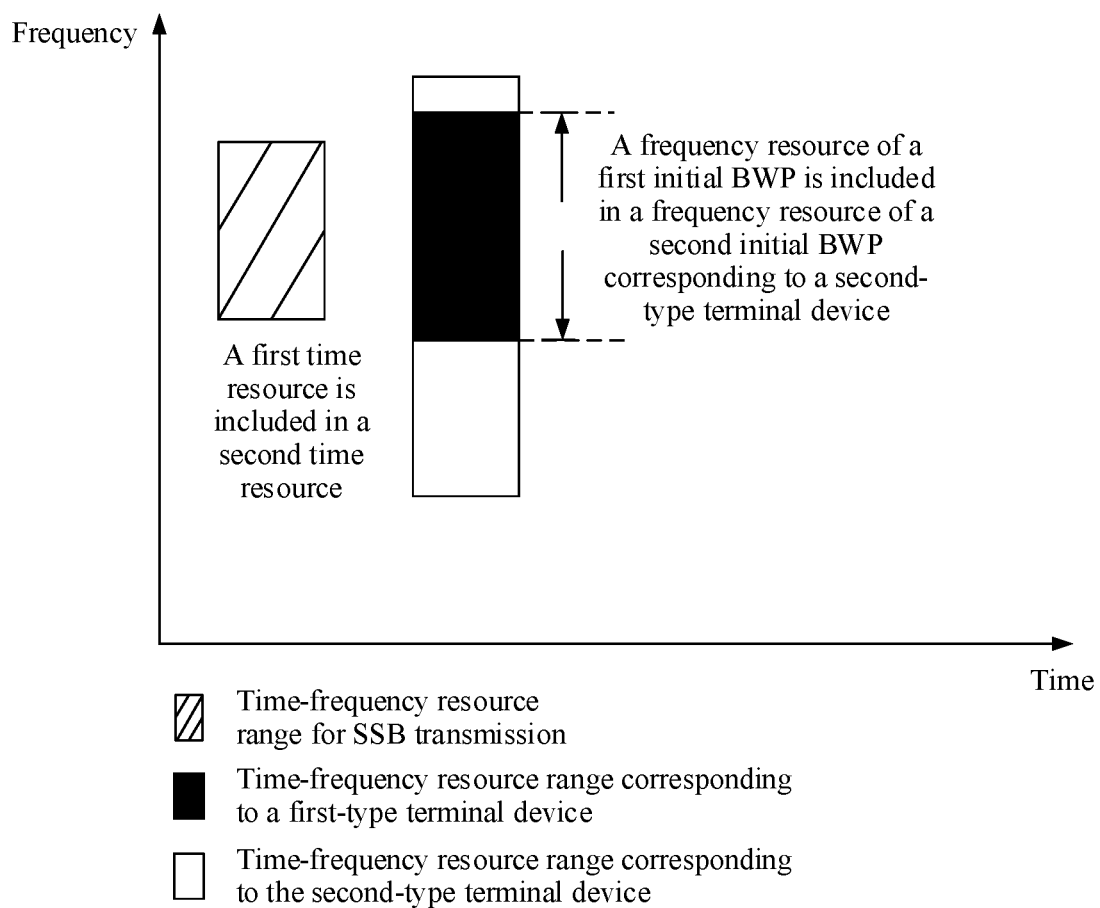
FIG. 11 is a schematic diagram of another method for determining an initial BWP according to an embodiment of this application.
Figure 12:
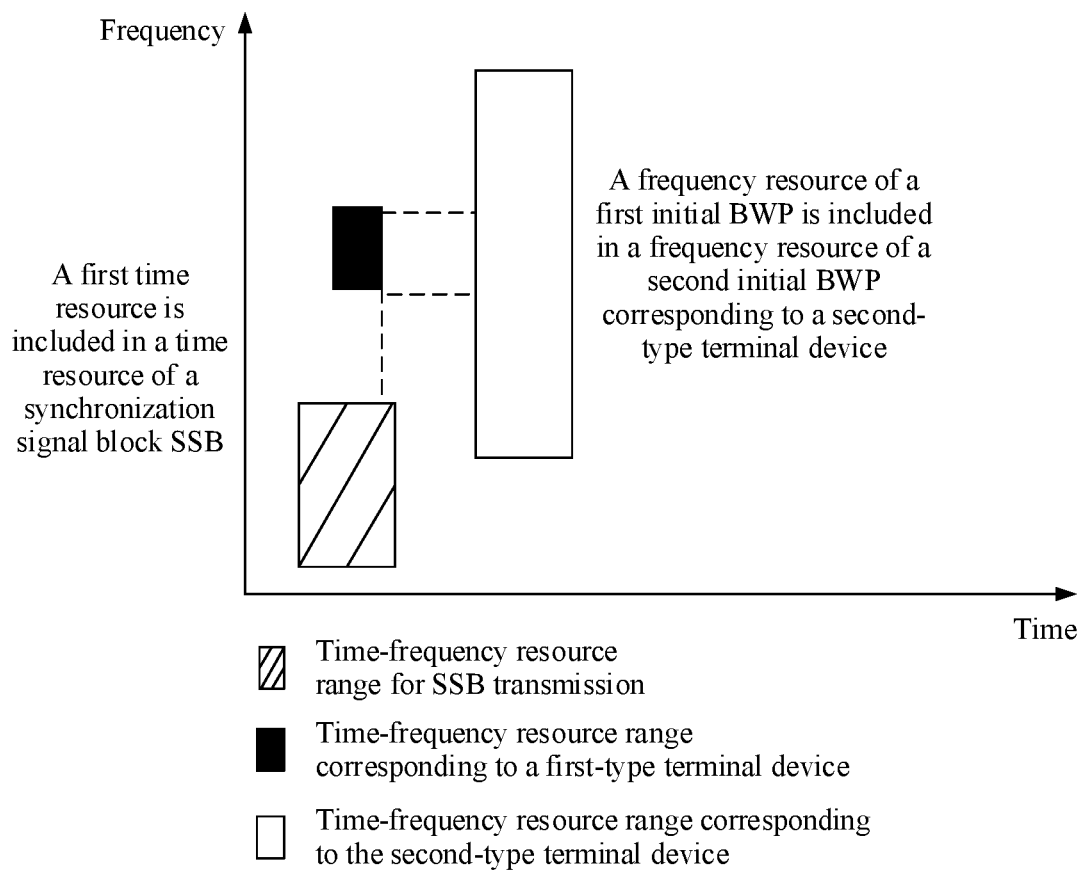
FIG. 12 is a schematic diagram of another method for determining an initial BWP according to an embodiment of this application.
Figure 13:
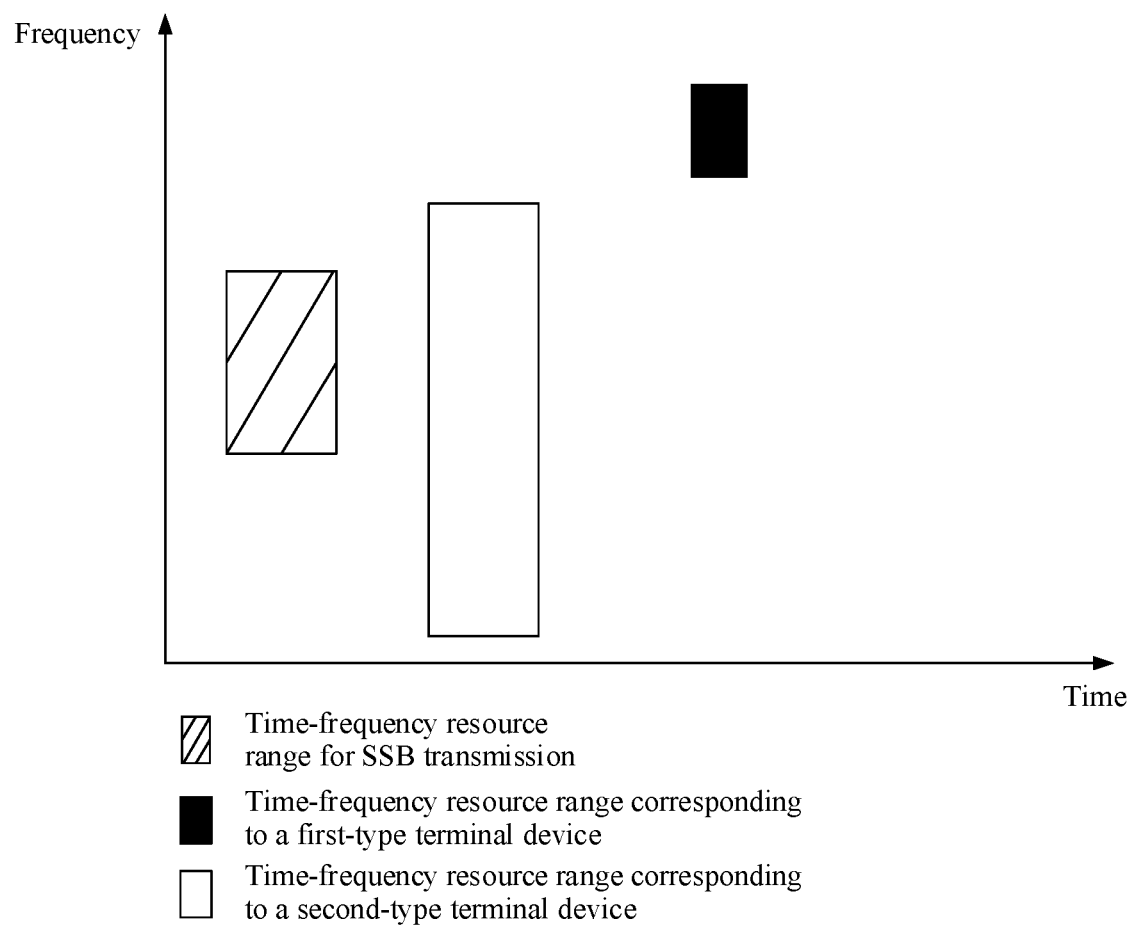
FIG. 13 is a schematic diagram of another method for determining an initial BWP according to an embodiment of this application.
Figure 14:
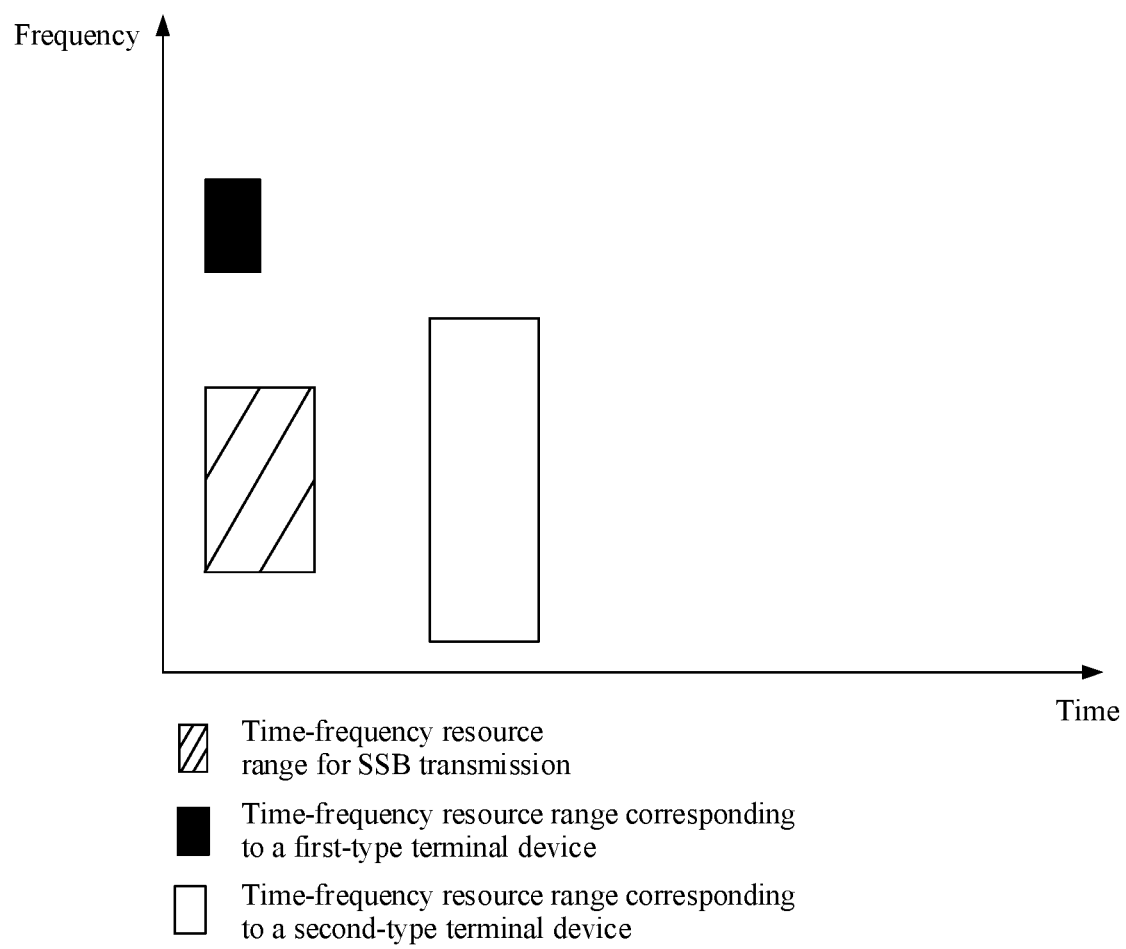
FIG. 14 is a schematic diagram of another method for determining an initial BWP according to an embodiment of this application.
Figure 15:
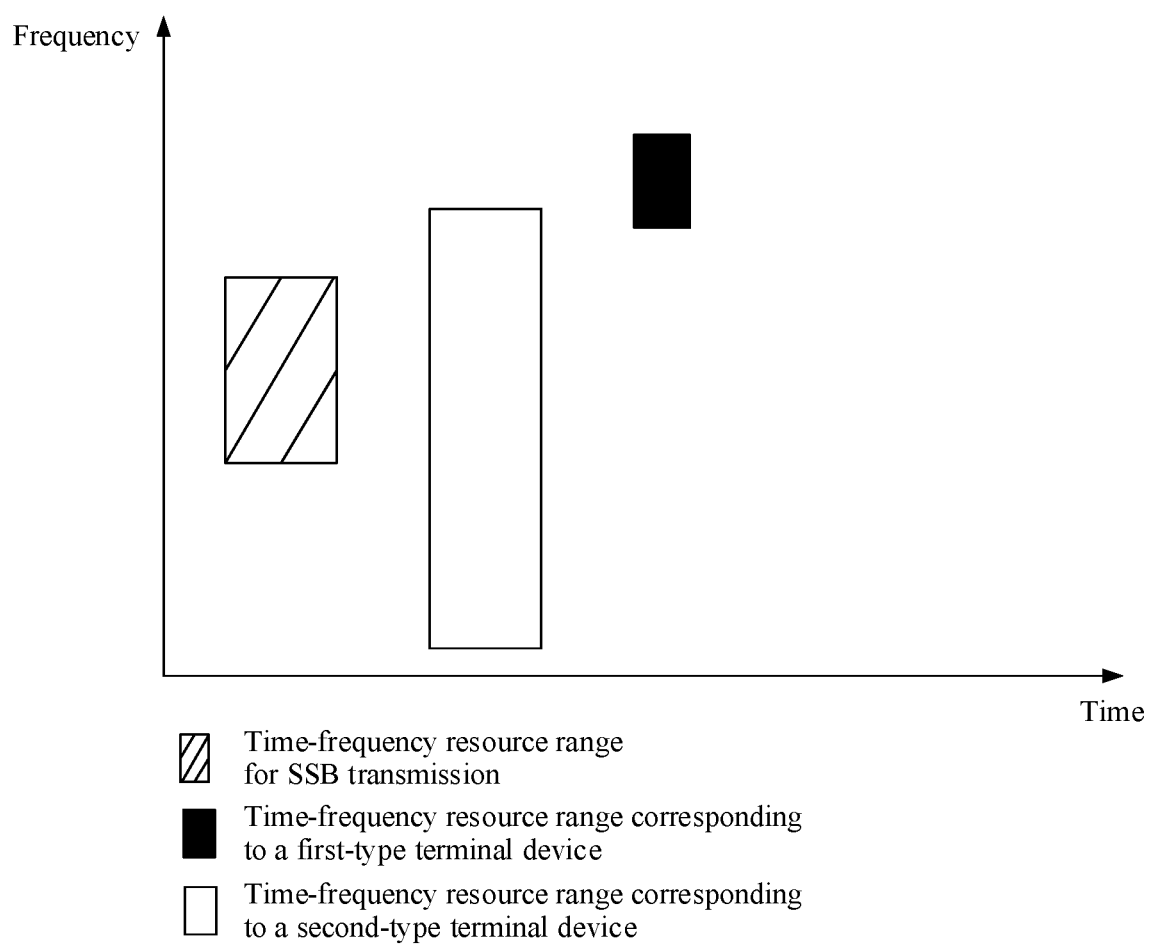
FIG. 15 is a schematic diagram of another method for determining an initial BWP according to an embodiment of this application.
Figure 16:
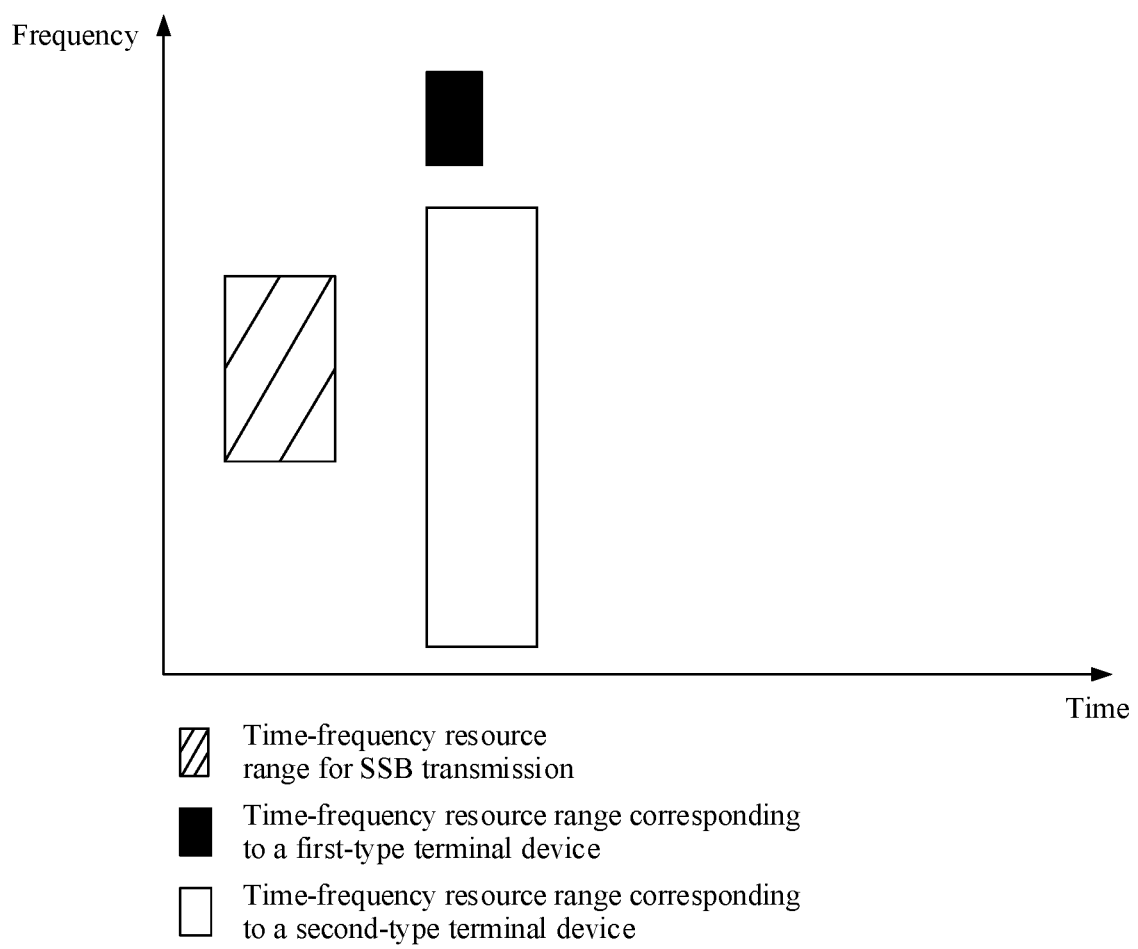
FIG. 16 is a schematic diagram of another method for determining an initial BWP according to an embodiment of this application.

It should be noted that any one of the three design manners of a time resource may be applied in combination with any one of the foregoing three design manners of a frequency resource. For example, the first design manner of a frequency resource may be applied in combination with the first design manner of a time resource of a CORESET 0. For details, refer to the schematic diagram of FIG. 3 for understanding. The first design manner of a frequency resource may be applied in combination with the second design manner of a time resource of a CORESET 0. For details, refer to a schematic diagram of FIG. 11 for understanding. The first design manner of a frequency resource may be applied in combination with the third design manner of a time resource of a CORESET 0. For details, refer to a schematic diagram of FIG. 12 for understanding. The second design manner of a frequency resource may be applied in combination with the first design manner of a time resource of a CORESET 0. For details, refer to a schematic diagram of FIG. 13 for understanding. The second design manner of a frequency resource may be applied in combination with the second design manner of a time resource of a CORESET 0. For details, refer to the schematic diagram of FIG. 9 for understanding. The second design manner of a frequency resource may be applied in combination with the third design manner of a time resource of a CORESET 0. For details, refer to a schematic diagram of FIG. 14 for understanding. The third design manner of a frequency resource may be applied in combination with the first design manner of a time resource of a CORESET 0. For details, refer to a schematic diagram of FIG. 15 for understanding. The third design manner of a frequency resource may be applied in combination with the second design manner of a time resource of a CORESET 0. For details, refer to a schematic diagram of FIG. 16 for understanding. The third design manner of a frequency resource may be applied in combination with the third design manner of a time resource of a CORESET 0. For details, refer to the schematic diagram of FIG. 10 for understanding. Optionally, the network device may flexibly configure the foregoing combinations based on a service requirement of the network device. For example, the network device may configure X configurations, where the X configurations include at least one of the foregoing combinations. Specifically, for example, if the network device configures only one configuration, the configuration may be one of the foregoing combinations, or if the network device configures two configurations, the two configurations are at least two of the foregoing combinations. A specific configuration used by the terminal device to determine the frequency resource of the first initial BWP and the time resource (the time resource of the CORESET 0) may be implemented in another manner. This is not specifically limited in this application.

The foregoing describes the method for determining an initial BWP from the perspective of how to determine the frequency resource of the initial BWP and how to determine the time resource of the CORESET 0. It should be noted that the first time resource may occur periodically. The following describes design methods of a periodicity of the first time resource with reference to specific examples.

(1) First design manner of a periodicity of a first time resource

Because a second time resource may appear periodically, the periodicity of the first time resource and a periodicity of the second time resource may be the same or different. For example, in a specific implementation, the periodicity of the first time resource may be an integer multiple or a fractional multiple of the periodicity of the second time resource. The periodicity of the first time resource and the periodicity of the second time resource are different, so that a network device can adaptively design, based on capabilities of terminal devices of different types, an appropriate time resource to carry common information transmission. This ensures resource utilization efficiency while ensuring common information transmission performance, especially coverage performance, and avoids unnecessary resource overheads on a network device side. It should be noted that the first design manner of a periodicity of a first time resource provided in this application may be independently applied, or may be used in combination with the three design manners of a frequency resource of an initial BWP and the three design manners of a time resource of a CORESET 0 that are described above. Specifically, when the first design manner of a periodicity of a time resource is used in combination with any one of the design manners of a time resource of a CORESET 0, the first design manner of each periodicity of a time resource is the same as the design manner of a time resource of a CORESET 0.

In a specific implementation, the first design manner of a periodicity of a first time resource may be applied in combination with the second design manner of a time resource of a CORESET 0. When the first design manner of a periodicity of a first time resource is applied in combination with the second design manner of a time resource of a CORESET 0, the first time resource is included in the second time resource, which may include at least one of the following understandings.

(1) The periodicity of the first time resource and the periodicity of the second time resource are the same, and the second time resource on which a second CORESET 0 appears includes a time resource of a first CORESET 0. For example, in one periodicity, the time resource of the second CORESET 0 corresponds to a time resource range from an $M1^{th}$ OFDM symbol to an $M2^{th}$ OFDM symbol (including the $M1^{th}$ OFDM symbol and the $M2^{th}$ OFDM symbol) that are in a slot. In this case, the time resource of the first CORESET 0 may correspond to an $M3^{th}$ OFDM symbol to an $M4^{th}$ OFDM symbol (including the $M3^{th}$ OFDM symbol and the $M4^{th}$ OFDM symbol) that are in the slot, where M3 is not less than M1, and M4 is not greater than M2.

(2) The periodicity of the first time resource and the periodicity of the second time resource are different, the periodicity of the first time resource is an integer multiple of the periodicity of the second time resource, and the first time resource is included in the second time resource on a time resource on which the first time resource overlaps the second time resource.

In addition, optionally, the first time resource may alternatively meet: The periodicity of the first time resource and the periodicity of the second time resource are different, the periodicity of the first time resource is a fractional multiple of the periodicity of the second time resource, and the first time resource is included in the second time resource on a time resource on which the first time resource overlaps the second time resource. For example, the periodicity of the second time resource is 10 ms, and the periodicity of the first time resource is 5 ms. In this embodiment of this application, the first time resource is also included in the second time resource on the overlapping resource. Therefore, this implementation may also be understood as that the first time resource is included in the second time resource.

In the foregoing implementation, the first time resource may be included in the second time resource (for example, in (1) and (2)), or a part of the first time resource may be included in the second time resource (for example, in (3)). Therefore, the network device may transmit, within a range of the second time resource, common information corresponding to a first-type terminal device. In addition, the network device may further transmit, in the second time resource, common information corresponding to a second-type terminal device. Therefore, when the network device sends common information to terminal devices of different types, the network device may increase a probability of shutting down a symbol (where for example, the symbol that is shut down may be a symbol carrying the common information transmission corresponding to the first-type terminal device and the second-type terminal device), so that power consumption required by the network device for data transmission is further reduced.

(2) Second design manner of a periodicity of a first time resource

Because a time resource of an SSB appears periodically, the periodicity of the first time resource and a periodicity of a time resource of an SSB corresponding to a first-type terminal device may be the same or different. In a specific implementation, the periodicity of the first time resource may be an integer multiple or a fractional multiple of the periodicity of the time resource of the SSB. The periodicity of the first time resource and the transmission periodicity of the SSB are different, so that a network device can adaptively design, based on coverage performance of different data, an appropriate time resource to carry common information transmission. This ensures resource utilization efficiency, and avoids unnecessary resource overheads on a network device side. For example, in SSB transmission, the terminal device may ensure SSB transmission performance through energy accumulation. For a first time resource including common information transmission, a transmission periodicity different from that of the SSB may be set to ensure transmission performance of common information.

It should be noted that the second design manner of a periodicity of a first time resource provided in this application may be independently applied, or may be used in combination with the three design manners of a frequency resource of an initial BWP and the three design manners of a time resource of a CORESET 0 that are described above. Specifically, when the second design manner of a periodicity of a time resource is used in combination with any one of the design manners of a time resource of a CORESET 0, the second design manner of each periodicity of a time resource is the same as the design manner of a time resource of a CORESET 0.

In a specific implementation, when the second design manner is applied in combination with the third design manner of a time resource of a CORESET 0, the first time resource is included in the time resource of the SSB, which may include at least one of the following understandings.

(1) The periodicity of the first time resource and the periodicity of the time resource of the SSB are the same, and the time resource on which the SSB appears includes a time resource of a first CORESET 0. For example, in one periodicity, the time resource of the SSB corresponds to a time resource range from an $M1^{th}$ OFDM symbol to an $M2^{th}$ OFDM symbol (including the $M1^{th}$ OFDM symbol and the $M2^{th}$ OFDM symbol) that are in a slot. In this case, the time resource of the first CORESET 0 may correspond to an $M3^{th}$ OFDM symbol to an $M4^{th}$ OFDM symbol (including the M3$^{th}$ OFDM symbol and the M4$^{th}$ OFDM symbol) that are in the slot, where M3 is not less than M1, and M4 is not greater than M2.

(2) The periodicity of the first time resource and the periodicity of the time resource of the SSB are different, the periodicity of the first time resource is an integer multiple of the periodicity of the time resource of the SSB, and the first time resource is included in the time resource of the SSB on a time resource on which the first time resource overlaps the time resource of the SSB.

(3) In addition, optionally, the first time resource may alternatively meet: The periodicity of the first time resource and the transmission periodicity of the SSB are different, the periodicity of the first time resource is a fractional multiple of the transmission periodicity of the SSB, and the first time resource is included in the time resource of the SSB on a time resource on which the first time resource overlaps the second time resource. For example, the transmission periodicity of the SSB is 10 ms, and the periodicity of the first time resource is 5 ms. In this embodiment of this application, the first time resource is also included in the time resource of the SSB on the overlapping resource. Therefore, this implementation may also be understood as that the first time resource is included in the time resource of the SSB.

In manner (3), the first time resource is included in the time resource of the SSB, or a part of the first time resource is included in the time resource of the SSB. Therefore, a probability of shutting down a symbol by the network device can be increased, so that power consumption required by the network device for common information transmission and SSB transmission can be reduced.

It should be noted that a first time resource whose NR carrier frequency is greater than 6 GHz may also have the foregoing features.

It should be noted that, in embodiments of this application, the periodicity of the first time resource, the periodicity of the time resource including common information transmission, or the periodicity of the time resource of the first CORESET 0 may be a default periodicity of the terminal device, for example, 20 ms, or may be a periodicity used by the network device to send the common information or a periodicity used by the network device to actually send the common information. For example, the periodicity used by the network device to send the common information may be 5 ms, 10 ms, 20 ms, 40 ms, or the like, and the periodicity used by the network device to actually send the common information may be any value of the periodicity used by the network device to send the common information. The descriptions are the same for the periodicity of the second time resource, and details are not described. In addition, the transmission periodicity of the SSB may also be a default periodicity of the terminal device, a periodicity used by the network device to send the SSB, or a periodicity used by the network device to actually send the SSB. For example, the periodicity used by the network device to send the SSB may be 5 ms, 10 ms, 20 ms, 40 ms, or the like, and the periodicity used by the network device to actually send the SSB may be any value of the periodicity used by the network device to send the common information.

The method for determining an initial BWP provided in this application is described above from three aspects: design manners of a frequency resource, design manners of a time resource of a CORESET 0, and design manners of a periodicity of a time resource. The design manners provided in this application are simple in design, have an original design intention of an existing second initial BWP, and reduce standard design complexity.

It may be understood that to implement the foregoing functions, the foregoing first-type terminal device includes corresponding hardware structures and/or software modules for performing the various functions. A person skilled in the art should be easily aware that, with reference to modules and algorithm steps of each example described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In terms of a hardware structure, the first-type terminal device in FIG. 3 to FIG. 16 may be implemented by one physical device, or may be jointly implemented by a plurality of physical devices, or may be a logical function module in one physical device. This is not specifically limited in embodiments of this application.

Figure 17:
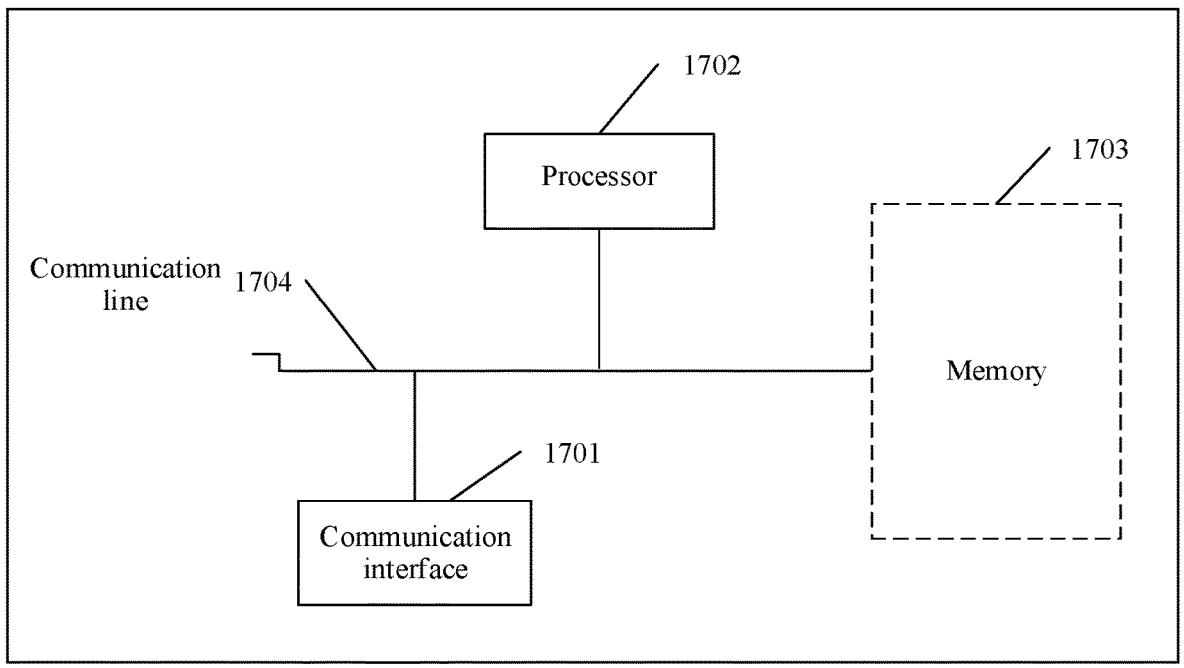
FIG. 17 is a schematic diagram of a hardware structure of a terminal device according to an embodiment of this application.

For example, the first-type terminal device, namely, the terminal device, may also be referred to as an apparatus for determining an initial downlink bandwidth part BWP, and may be implemented via a communication device in FIG. 17. FIG. 17 is a schematic diagram of a hardware structure of a terminal device according to an embodiment of this application. The terminal device includes a communication interface 1701 and a processor 1702, and may further include a memory 1703.

The communication interface 1701 is configured to communicate with another device or a communication network, such as an Ethernet, a radio access network (radio access network, RAN), or a wireless local area network (wireless local area network, WLAN) via any apparatus such as a transceiver.

The processor 1702 includes but is not limited to one or more of a central processing unit (central processing unit, CPU), a network processor (network processor, NP), an application-specific integrated circuit (application-specific integrated circuit, ASIC), or a programmable logic device (programmable logic device, PLD). The PLD may be a complex programmable logic device (complex programmable logic device, CPLD), a field-programmable gate array (field-programmable gate array, FPGA), generic array logic (generic array logic, GAL), or any combination thereof. The processor 1702 is responsible for a communication line 1704 and general processing, and may further provide various functions, including timing, peripheral interfacing, voltage regulation, power management, and another control function. The memory 1703 may be configured to store data used by the processor 1702 to perform an operation.

The memory 1703 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 1703 is not limited thereto. The memory may exist independently, and is connected to the processor 1702 through the communication line 1704. Alternatively, the memory 1703 may be integrated with the processor 1702. If the memory 1703 and the processor 1702 are mutually independent components, the memory 1703 is connected to the processor 1702. For example, the memory 1703 and the processor 1702 may communicate with each other through the communication line. The communication interface 1701 and the processor 1702 may communicate with each other through the communication line, or the communication interface 1701 may be directly connected to the processor 1702.

The communication line 1704 may include any quantity of interconnected buses and bridges, and the communication line 1704 links various circuits of one or more processors 1702 represented by the processor 1702 and a memory represented by the memory 1703. The communication line 1704 may further link various other circuits such as a peripheral device, a voltage stabilizer, and a power management circuit. These are well known in the art, and therefore are not further described in this application.

In a specific implementation, the terminal device may include: a processor, configured to: execute a program stored in a memory; and when the program stored in the memory is executed, determine a frequency resource of a first initial BWP corresponding to a first-type terminal device, where the frequency resource of the first initial BWP may be included in a frequency resource of a second initial BWP corresponding to a second-type terminal device, and the first-type terminal device and the second-type terminal device have different capabilities; and a communication interface, where the communication interface is coupled to the processor, and is configured to transmit signaling and/or data to a network device based on the frequency resource of the first initial BWP.

In a specific implementation, the terminal device may include: a processor, configured to determine a frequency resource of an initial BWP corresponding to a first-type terminal device, where the frequency resource of the first initial BWP does not overlap a frequency resource of a second initial BWP, and the first-type terminal device and a second-type terminal device have different capabilities; and a communication interface, where the communication interface is coupled to the processor, and is configured to transmit signaling and/or data to a network device based on the frequency resource of the first initial BWP.

In a specific implementation, the terminal device may include: a processor, configured to determine a frequency resource of an initial BWP corresponding to a first-type terminal device, where the frequency resource of the first initial BWP does not overlap a frequency resource of a synchronization signal block SSB, and the first-type terminal device and a second-type terminal device have different capabilities; and a communication interface, where the communication interface is coupled to the processor, and is configured to transmit signaling and/or data to a network device based on the frequency resource of the first initial BWP.

In a specific implementation, that the first-type terminal device and the second-type terminal device have different capabilities may include at least one of the following: the first-type terminal device and the second-type terminal device have different bandwidth capabilities; the first-type terminal device and the second-type terminal device have different quantities of transmit and receive antennas; or the first-type terminal device and the second-type terminal device have different maximum uplink transmit powers.

In a specific implementation, the frequency resource of the first initial BWP is determined based on a first frequency offset, the first frequency offset belongs to a first set, and the first set is a set of second frequency offsets. The first frequency offset is an offset of the frequency resource of the first initial BWP relative to a frequency resource of a synchronization signal block SSB, and the second frequency offset is an offset of the frequency resource of the second initial BWP relative to the frequency resource of the SSB.

In a specific implementation, the first frequency offset is determined based on first configuration information from the network device, and the first configuration information is used to configure the frequency resource of the second initial BWP.

In a specific implementation, the first frequency offset is the same as the second frequency offset.

In a specific implementation, the processor is specifically configured to: determine a first index value based on the first configuration information; determine M index values, where M is a positive integer, the M index values and the first index value are used to indicate the frequency offsets that may be included in the first set, and the M index values are all less than or equal to an index value of the first index value; and determine the first frequency offset based on a frequency offset indicated by any one of the M index values.

In a specific implementation, the processor is specifically configured to: determine a first index value based on the first configuration information; determine a second index value, where the second index value is a value obtained by performing a modulo operation on the first index value using a preset value, and the first index value and the second index value indicate the frequency offsets that may be included in the first set; and determine the first frequency offset based on the second index value.

In a specific implementation, the first frequency offset is determined based on a first quantity of time-frequency resources, the first quantity of time-frequency resources and a second quantity of time-frequency resources correspond to the frequency offsets that may be included in the first set, the first quantity of time-frequency resources is a quantity of time-frequency resources closest to the second quantity of time-frequency resources, and the second quantity of time-frequency resources is a quantity of time-frequency resources corresponding to a CORESET 0 of the second-type terminal device.

In a specific implementation, the processor is further configured to determine a time resource of a first control resource set 0 CORESET 0 corresponding to the first-type terminal device, where a radio frame in which first time resources are located cannot include a time resource for transmitting the synchronization signal block SSB, or a slot in which a first time resource is located cannot include a time resource of the second CORESET 0 corresponding to the second-type terminal device.

In a specific implementation, first time resources corresponding to the same SSB are distributed in two consecutive slots in a radio frame.

In a specific implementation, the processor is further configured to determine a time resource of a first control resource set 0 CORESET 0 corresponding to the first-type terminal device, where a first time resource may be included in a second time resource.

In a specific implementation, the processor is further configured to determine a time resource of a first control resource set 0 CORESET 0 corresponding to the first-type terminal device, where a first time resource may be included in a time resource of the synchronization signal block SSB.

Optionally, with reference to the eighth to the tenth possible implementations of the seventh aspect, in a twelfth possible implementation, the first time resource is determined based on second configuration information from the network device, and the second configuration information is used to configure the second time resource.

Figure 18:
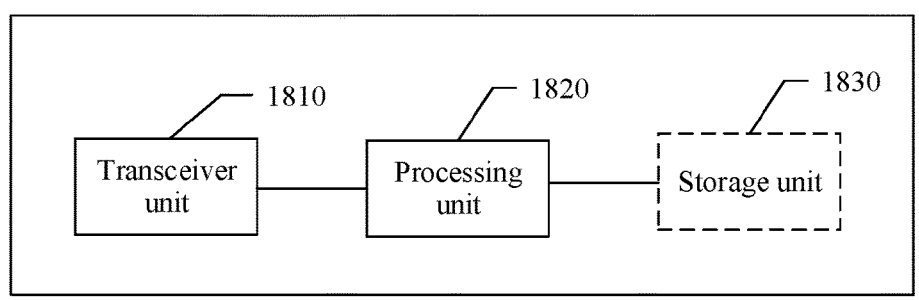
FIG. 18 is a schematic diagram of a structure of a terminal device according to an embodiment of this application.

In embodiments of this application, the communication interface may be considered as a transceiver unit of the terminal device, the processor that has a processing function may be considered as a processing unit of the terminal device, and the memory may be considered as a storage unit of the terminal device. As shown in FIG. 18, a terminal device includes a transceiver unit 1810, a processing unit 1820, and a storage unit 1830. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1810 and that is configured to implement a receiving function may be considered as a receiving unit, and a component that is in the transceiver unit 1810 and that is configured to implement a sending function may be considered as a sending unit. That is, the transceiver unit 1810 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitting circuit, or the like.

In a specific implementation, the transceiver unit 1810 is configured to perform the receiving and sending operations on a side of a first-type terminal device in FIG. 3 to FIG. 15. The processing unit 1820 is configured to perform the processing steps on the side of the first-type terminal device in FIG. 3 to FIG. 15. The storage unit 1830 is configured to perform the storage steps on the side of the first-type terminal device in FIG. 3 to FIG. 15.

All or some of the foregoing embodiments may be implemented by using software, hardware, firmware, or any combination thereof. When the software is used to implement embodiments, all or some of embodiments may be implemented in a form of a computer program product.

The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

A person of ordinary skill in the art may understand that all or some of the steps of the methods in embodiments may be implemented by a program instructing related hardware. The program may be stored in a computer-readable storage medium. The storage medium may include a ROM, a RAM, a magnetic disk, an optical disc, or the like.

The foregoing describes in detail the methods for determining an initial downlink bandwidth part BWP, the apparatuses, and the storage medium that are provided in embodiments of this application. Principles and implementations of this application are described in this specification by using specific examples. The descriptions of the foregoing embodiments are merely provided to help understand the methods and core ideas of this application. In addition, a person of ordinary skill in the art can make variations and modifications to this application in terms of the specific implementations and application scopes based on the ideas of this application. Therefore, the content of this specification shall not be construed as a limit to this application.

What is claimed is:

1. A communication method, wherein the method is applicable to a first-type terminal device or a chip of the first-type terminal device, the first-type terminal device is a new radio (NR) reduced capability terminal device, and the method comprises:
    receiving a synchronization signal block (SSB) from a network device;
    receiving a system information block (SIB 1) from the network device, wherein the SIB 1 configures a frequency resource of a first initial bandwidth part (BWP);
    determining the frequency resource of the first initial BWP corresponding to the first-type terminal device, wherein the frequency resource of the first initial BWP does not overlap a frequency resource of the SSB; and
    receiving signaling or data from the network device based on the frequency resource of the first initial BWP;
    wherein the frequency resource of the SSB overlaps a second initial BWP corresponding to a second-type terminal device, the first-type terminal device and the second-type terminal device have different capabilities, and the second-type terminal device is not an NR reduced capability terminal device.

2. The method according to claim 1, wherein the first-type terminal device and the second-type terminal device have different capabilities comprises at least one of the following:
    the first-type terminal device and the second-type terminal device have different bandwidth capabilities;
    the first-type terminal device and the second-type terminal device have different quantities of transmit and receive antennas; or
    the first-type terminal device and the second-type terminal device have different maximum uplink transmit powers.

3. The method according to claim 1, wherein the first initial BWP comprises at least one of:
    system information or control information for scheduling transmission of the system information;
    paging information or control information for scheduling transmission of the paging information; and
    random access response information.

4. The method according to claim 1, wherein the first initial BWP is an initial BWP of the first-type terminal device in radio resource control (RRC) idle state or RRC inactive state.

5. A communication method, wherein the method is applicable to a network device or a chip of the network device, and the method comprises:
   transmitting a synchronization signal block (SSB);
   transmitting a system information block (SIB 1), wherein the SIB 1 configures a frequency resource of a first initial bandwidth part (BWP) corresponding to a first-type terminal device, and wherein the frequency resource of the first initial BWP does not overlap a frequency resource of the SSB; and
   transmitting signaling or data to the first-type terminal device based on the frequency resource of the first initial BWP, wherein the first-type terminal device is a new radio (NR) reduced capability terminal device;
   wherein the frequency resource of the SSB overlaps a second initial BWP corresponding to a second-type terminal device, the first-type terminal device and the second-type terminal device have different capabilities, and the second-type terminal device is not an NR reduced capability terminal device.

6. The method according to claim 5, wherein that the first-type terminal device and the second-type terminal device have different capabilities comprises at least one of the following:
   the first-type terminal device and the second-type terminal device have different bandwidth capabilities;
   the first-type terminal device and the second-type terminal device have different quantities of transmit and receive antennas; or
   the first-type terminal device and the second-type terminal device have different maximum uplink transmit powers.

7. The method according to claim 5, wherein the first initial BWP comprises at least one of:
   system information or control information for scheduling transmission of the system information;
   paging information or control information for scheduling transmission of the paging information; and
   random access response information.

8. The method according to claim 5, wherein the first initial BWP is an initial BWP of the first-type terminal device in radio resource control (RRC) idle state or RRC inactive state.

9. An apparatus, wherein the apparatus is a new radio (NR) reduced capability terminal device or a chip of the NR reduced capability terminal device, the apparatus comprising:
   one or more processors; and
   one or more memories coupled to the one or more processors and storing programming instructions for execution by the one or more processors to cause the apparatus to perform operations comprising:
   receiving a synchronization signal block (SSB) from a network device;
   receiving a system information block (SIB 1) from the network device, wherein the SIB 1 configures a frequency resource of a first initial bandwidth part (BWP);
   determining the frequency resource of the first initial BWP corresponding to the apparatus, wherein the frequency resource of the first initial BWP does not overlap a frequency resource of the SSB; and
   receiving signaling or data from the network device based on the frequency resource of the first initial BWP;
   wherein the frequency resource of the SSB overlaps a second initial BWP corresponding to a second apparatus, the apparatus and the second apparatus have different capabilities, and the second apparatus is not an NR reduced capability terminal device.

10. The apparatus according to claim 9, wherein the apparatus and the second apparatus have different capabilities comprises at least one of the following:
    the apparatus and the second apparatus have different bandwidth capabilities;
    the apparatus and the second apparatus have different quantities of transmit and receive antennas; or
    the apparatus and the second apparatus have different maximum uplink transmit powers.

11. The apparatus according to claim 9, wherein the first initial BWP comprises at least one of:
    system information or control information for scheduling transmission of the system information;
    paging information or control information for scheduling transmission of the paging information; and
    random access response information.

12. The apparatus according to claim 9, wherein the first initial BWP is an initial BWP of the apparatus in radio resource control (RRC) idle state or RRC inactive state.

13. An apparatus, comprising:
    one or more processors; and
    one or more memories coupled to the one or more processors and storing programming instructions for execution by the one or more processors to cause the apparatus to perform operations comprising:
    transmitting a synchronization signal block (SSB);
    transmitting a system information block (SIB 1), wherein the SIB 1 configures a frequency resource of a first initial bandwidth part (BWP) corresponding to a first-type terminal device, and wherein the frequency resource of the first initial BWP does not overlap a frequency resource of the SSB; and
    transmitting signaling or data to the first-type terminal device based on the frequency resource of the first initial BWP, wherein the first-type terminal device is a new radio (NR) reduced capability terminal device;
    wherein the frequency resource of the SSB overlaps a second initial BWP corresponding to a second-type terminal device, the first-type terminal device and the second-type terminal device have different capabilities, and the second-type terminal device is not an NR reduced capability terminal device.

14. The apparatus according to claim 13, wherein the first-type terminal device and the second-type terminal device have different capabilities comprises at least one of the following:
    the first-type terminal device and the second-type terminal device have different bandwidth capabilities;
    the first-type terminal device and the second-type terminal device have different quantities of transmit and receive antennas; or
    the first-type terminal device and the second-type terminal device have different maximum uplink transmit powers.

15. The apparatus according to claim 13, wherein the first initial BWP comprises at least one of:
    system information or control information for scheduling transmission of the system information;
    paging information or control information for scheduling transmission of the paging information; and
    random access response information.

16. The apparatus according to claim 13, wherein the first initial BWP is an initial BWP of the first-type terminal device in radio resource control (RRC) idle state or RRC inactive state.

* * * * *